US011366631B2

(12) United States Patent
Sakai et al.

(10) Patent No.: US 11,366,631 B2
(45) Date of Patent: Jun. 21, 2022

(54) INFORMATION PROCESSING DEVICE, INFORMATION PROCESSING METHOD, AND PROGRAM

(71) Applicant: SONY CORPORATION, Tokyo (JP)

(72) Inventors: Yusuke Sakai, Kanagawa (JP); Ryusei Koike, Kanagawa (JP); Haruo Oba, Kanagawa (JP); Motoki Higashide, Tokyo (JP); Daisuke Miki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/058,230

(22) PCT Filed: May 29, 2019

(86) PCT No.: PCT/JP2019/021432
§ 371 (c)(1),
(2) Date: Nov. 24, 2020

(87) PCT Pub. No.: WO2019/230852
PCT Pub. Date: Dec. 5, 2019

(65) Prior Publication Data
US 2021/0157541 A1  May 27, 2021

(30) Foreign Application Priority Data
Jun. 1, 2018 (JP) .............................. JP2018-105824

(51) Int. Cl.
*G06F 3/14* (2006.01)
*G06T 7/00* (2017.01)
*G06T 11/00* (2006.01)

(52) U.S. Cl.
CPC .......... *G06F 3/1454* (2013.01); *G06F 3/1446* (2013.01); *G06T 7/0004* (2013.01);
(Continued)

(58) Field of Classification Search
CPC ...................................... H04N 7/147
See application file for complete search history.

(56) References Cited

U.S. PATENT DOCUMENTS

2016/0054797 A1\* 2/2016 Tokubo ................. A63F 13/212
                                                            345/633
2016/0350973 A1\* 12/2016 Shapira .................. G06F 3/016
(Continued)

FOREIGN PATENT DOCUMENTS

| JP | 2009-145883 A | 7/2009 |
|----|----|----|
| JP | 2018-073093 A | 5/2018 |
| WO | WO 2017/030193 A1 | 2/2017 |

*Primary Examiner* — Phi Hoang
(74) *Attorney, Agent, or Firm* — Paratus Law Group, PLLC

(57) ABSTRACT

Provided is an information processing device provided with an obtaining unit (211) that obtains first physical information of a first user present in a first space, and second physical information of a second user present in a second space, a virtual space generation unit (213) that generates a virtual space on the basis of the first physical information or the second physical information, as operation mode control unit (211) that switches an operation mode in a case where a trigger caused by at least any one of the first user or the second user occurs, and a control unit (210) that interlocks switch of the operation mode with at least one device present is the first space or at least one device present in the second space.

16 Claims, 35 Drawing Sheets

(52) U.S. Cl.
CPC .......... *G06T 11/00* (2013.01); *G06T 2200/24* (2013.01); *G06T 2207/30164* (2013.01)

(56) References Cited

U.S. PATENT DOCUMENTS

| | | | |
|---|---|---|---|
| 2017/0034473 A1* | 2/2017 | Sato | H04N 7/142 |
| 2018/0035077 A1* | 2/2018 | Sato | G06Q 10/10 |
| 2018/0158222 A1* | 6/2018 | Hayashi | G06F 3/0304 |
| 2019/0212901 A1* | 7/2019 | Garrison | G09G 5/12 |

* cited by examiner

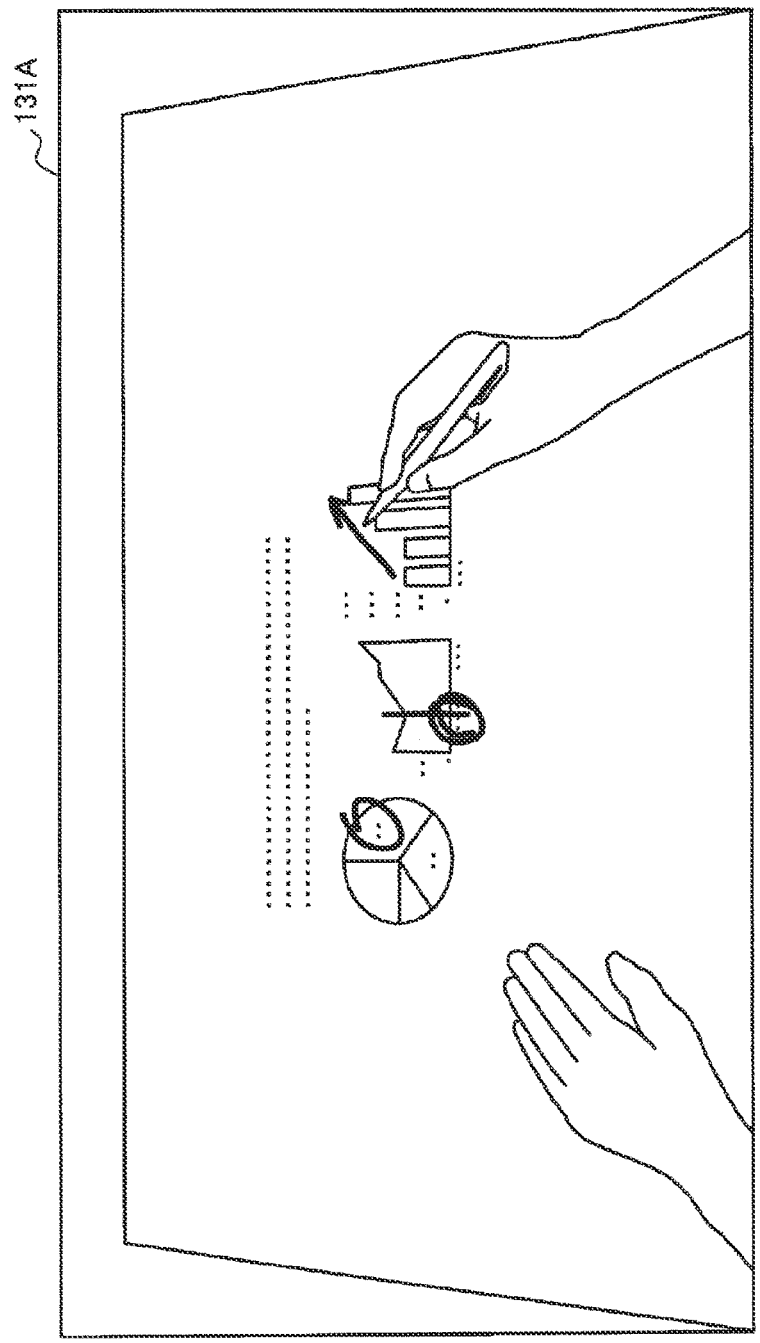

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2019/021432 (filed on May 29, 2019) under 35 U.S.C. § 371, which claims priority to Japanese Patent Application No. 2018-105824 (filed on Jun. 1, 2018), which are all hereby incorporated by reference in their entirety.

TECHNICAL FIELD

The present disclosure relates to an information processing device, an information processing method, and a program.

BACKGROUND ART

In recent years, various technologies have been developed to effectively realize transmission of techniques and skills. For example, following Patent Document 1 discloses a device capable of more effectively transmitting techniques and skills regarding a work by presenting a virtual object serving as a model of the work recorded in advance to a user who now works.

Here, in order to more effectively transmit techniques and skills, it is more preferable that an instructor and a student located in the same space communicate with each other in real time instead of presenting a recorded virtual object as a model as disclosed in Patent Document 1. However, in a case where the instructor and the student are remotely located, it is not easy for them to move so as to be located in the same space.

Here, as a system for supporting communication between users remotely located, a conference system and the like using a videophone has been conventionally proposed, and the instructor may provide guidance to the students using this conference system and the like.

CITATION LIST

Patent Document

Patent Document 1: International Publication No. 2017/030193

SUMMARY OF THE INVENTION

Problems to be Solved by the Invention

However, although the conventional conference system may realize mutual confirmation of conditions, document data sharing and the like, this cannot make a plurality of users located in different spaces feel as if they work in the same space. Therefore, it is not easy to transmit the techniques and skills by using the conventional conference system and the like.

Therefore, the present disclosure proposes an information processing device, an information processing method, and a program capable of providing to a plurality of users present in different spaces a feeling as if the respective users work in the same space.

Solutions to Problems

According to the present disclosure, provided is an information processing device provided with an obtaining unit that obtains first physical information of a first user present in a first space, and second physical information of a second user present in a second space, a virtual space generation unit that generates a virtual space on the basis of the first physical information or the second physical information, an operation mode control unit that switches an operation mode in a case where a trigger caused by at least any one of the first user or the second user occurs, and a control unit that interlocks switch of the operation mode with at least one device present in the first space or at least one device present in the second space.

Furthermore, according to the present disclosure, provided is an information processing method executed by a computer, the method provided with obtaining first physical information of a first user present in a first space, and second physical information of a second user present in a second space, generating a virtual space on the basis of the first physical information or the second physical information, switching an operation mode in a case where a trigger caused by at least any one of the first user or the second user occurs, and interlocking switch of the operation mode with at least one device present in the first space or at least one device present in the second space.

Furthermore, according to the present disclosure, provided is a program chat allows a computer to realize obtaining first physical information of a first user present in a first space, and second physical information of a second user present in a second space, generating a virtual space on the basis of the first physical information or the second physical information, switching an operation mode in a case where a trigger caused by at least any one of the first user or the second user occurs, and interlocking switch of the operation mode with at least one device present in the first space or at least one device present in the second space.

Effects of the Invention

As described above, according to the present disclosure, it is possible to provide to a plurality of users located in different spaces a feeling as if the respective users work in the same space.

Note that, the effect described above is not necessarily limited, and it is also possible to obtain any one of the effects described in this specification or another effect which may be grasped from this specification together with or in place of the effect described above.

BRIEF DESCRIPTION OF DRAWINGS

FIG. 36 is a view for illustrating an application example of the information processing system according to the present disclosure.

MODE FOR CARRYING OUT THE INVENTION

Figure 1:
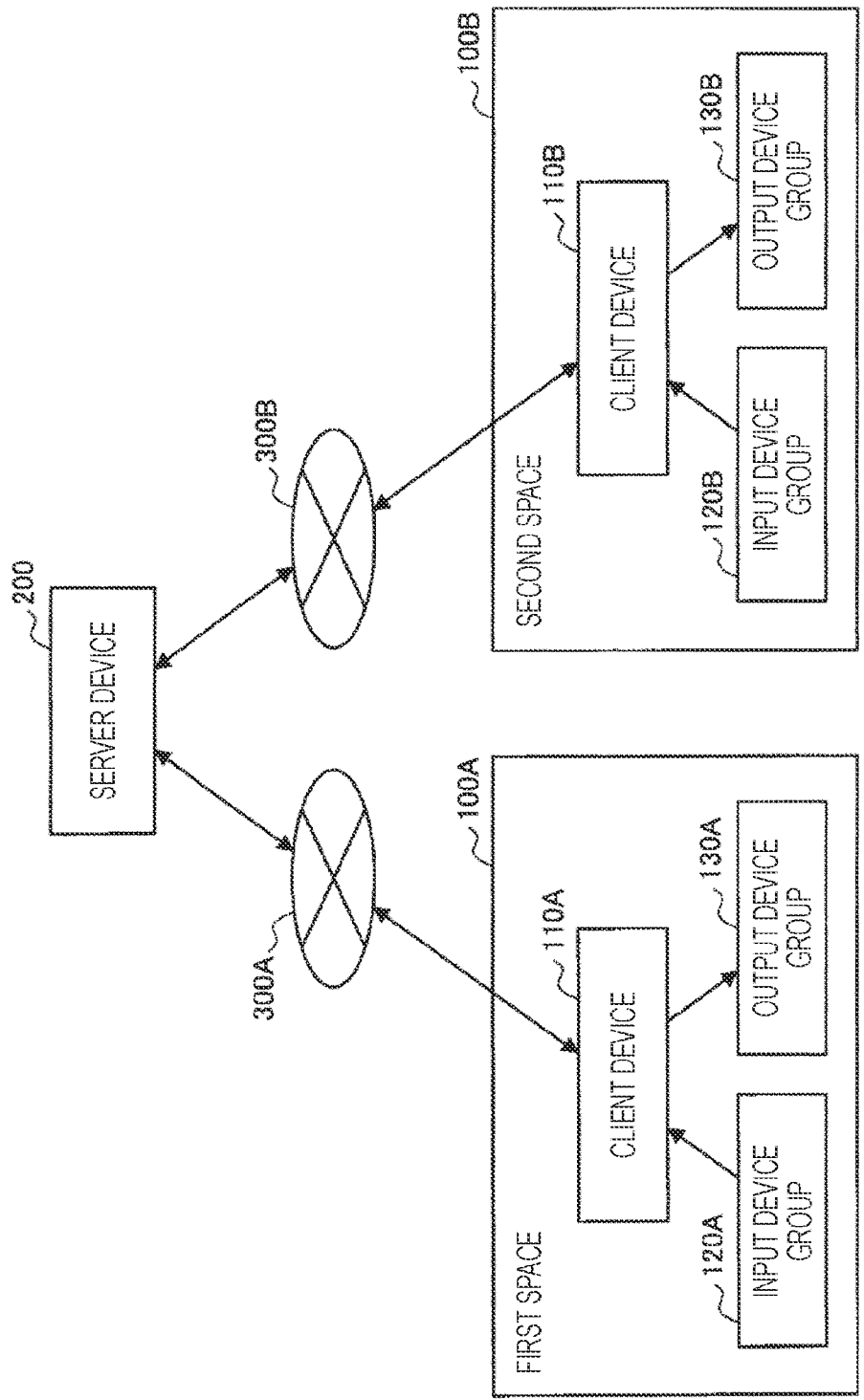
FIG. 1 is a block diagram illustrating a configuration example of an information processing system according to one embodiment of the present disclosure.

A preferred embodiment of the present disclosure is hereinafter described in detail with reference to the attached drawings. Note that, in this specification and the drawings, the components having substantially the same functional configuration are assigned with the same reference sign and the description thereof is not repeated.

Note that, the description is given in the following order.
1. Outline
2. Detail
3. Configuration example
4. Processing flow example
5. Variation
6. Hardware configuration example
7. Summary 1. Outline First, as outline of the present disclosure is described.

As described above, in order to more effectively transmit techniques and skills, it is more preferable that an instructor and a student located in the same space communicate with each other in real time instead of presenting a recorded virtual object as a model as disclosed in Patent Document 1. However, in a case where the instructor and the student are remotely located, it is not easy for them to move so as to be located in the same space. For example, in a case where students are scattered ail over the world, the instructor is required to provide guidance while moving around the world, so that an effect of guidance is limited.

Furthermore, as a system for supporting communication between users remotely located, a conference system and the like using a videophone has been conventionally proposed, and the instructor may provide guidance to the students using this conference system and the like.

However, although the conventional conference system may realize mutual confirmation of conditions, document data sharing and the like, this cannot make a plurality of users located in different spaces feel as if they work in the same space. For example, in a case where the instructor and the student are located in the same space, the student may observe work at hand of the instructor from an instructor's viewpoint, or the instructor may take a hand of the student to provide guidance; however, such transmitting method cannot be realized in the conference system. Therefore, it is not easy to transmit the techniques and skills by using the conventional conference system and the like.

A disclosing person of this application has achieved the technology according to the present disclosure in view of the above-described circumstances. An information processing device according to the present disclosure obtains first physical information of a first user (for example, an instructor) present in a first space or second physical information of a second user (for example, a student) present in a second space and generates a virtual space on the basis of the first physical information or the second physical information. More specifically, the information processing device generates the virtual space which reproduces a positional relationship between the first user and the second user.

Then, in a case where a trigger caused by at least any one of the first user or the second user occurs, the information processing device switches an operation mode, and interlocks switch of the operation mode with at least one device (for example, a display, a speaker and the like) provided in the first space or the second space. For example, the information processing device reflects information obtained by editing a captured image obtained by a camera 123 or partial information of the virtual space in the display or the speaker provided in the first space or the second space.

As a result, the information processing device may provide to the first user or the second user present in the different spaces a feeling as if the respective users work in the same space.

2. Detail

The outline of the present disclosure is described above. Subsequently, the present disclosure is described in detail.

(2.1. System Configuration Example)

First, a configuration example of an information processing system according to one embodiment of the present disclosure is described with reference to FIG. 1.

As illustrated in FIG. 1, in the information processing system according to this embodiment, there are a first space 100A and a second space 100B, and each space is provided with a client device 110, an input device group 120, and an output device group 130. Furthermore, the information processing system according to this embodiment is also provided with a server device 200 capable of communicating with the client device 110 in each space via a network 300.

The server device 200 is a device which serves as the "information processing device" described above. More specifically, the server device 200 obtains first physical information of a first user present in the first space 100A or second physical information of a second user present in the second space 100B by analyzing various types of input information from a client device 110A and a client device 110B, respectively, and generates a virtual space by using the first physical information or the second physical information. "Physical information (including the first physical information or the second physical information; hereinafter, for convenience, the "first physical information or the second physical information" is sometimes simply referred to as the "physical information")" is a concept including positional information of a body site of each user. Therefore, the server device 200 may reproduce a positional relationship (and posture) of the respective users in the virtual space on the basis of the physical information.

Furthermore, the server device 200 may obtain first environmental information including information regarding an object present in the first space 100A or second environmental information including information regarding an object present in the second space 100B by analyzing various types of input information from the client device 110A or the client device 110B, respectively, and generate the virtual space by also using the first environmental information or the second environmental information in addition to the physical information. "Environmental information (including the first environmental information or the second environmental information; hereinafter, for convenience, the "first environmental information or the second environmental information" is sometimes simply referred to as the "environmental information")" is a concept including positional information of each part of an object (including the input device group 120 and the output device group 130) present in each space. Therefore, the server device 200 may reproduce a positional relationship between the respective objects and a positional relationship between each object and each user in the virtual space by generating the virtual space on the basis of not only the physical information but also the environmental information.

Then, in a case where a predetermined trigger occurs, the server device 200 may switch an operation mode, generate control information on the basis of the operation mode, and provide the same to the client device 110A or the client device 110B, thereby controlling an output device group 130A or an output device group 130B in an interlocked manner. Note that, the server device 200 may control an input device group 120A or an input device group 120B.

The client device 110A is a device which comprehensively controls the device (the input device group 120A and the output device group 130A) provided in the first space 100A. For example, the client device 110A obtains various types of input information from the input device group 120A and provides the same to the server device 200, or controls the output device group 130A on the basis of the control information provided from the server device 200.

The input device group 120A is a device group which obtains the various types of input information, and may include, for example, a camera, a microphone, an arbitrary sensor or the like. The content and installation mode of the input device group 120A are not especially limited. This is described later in detail.

The output device group 130A is a device group which performs various outputs to the first user, and may include, for example, a display (including a table display 131 and a window display 133 described later), a speaker, a tactile sense presentation device or the like. The content and installation mode of the output device group 130A are not especially limited. This is described later in detail.

Note that, as for the client device 110B, the input device group 120B, and the output device group 130B provided in the second space 100B, the configurations are similar to those described above provided in the first space 100A, so that the description thereof is not repeated.

The configuration example of the information processing system according to this embodiment is described above. Note that, the configuration described above with reference to FIG. 1 is merely an example, and the configuration of the information processing system according to this embodiment is not limited to such example. For example, all or some of the functions of the server device 200 may be provided in the client device 110 or another external device. Furthermore, conversely, all or some of the functions of the client device 110 may be provided in the server device 200 or another external device. The configuration of the information processing system according to this embodiment is flexibly deformable according to specifications and operation. Furthermore, the configuration of the second space 100B does not have to be the same as the configuration of the first space 100A.

(2.2. Device Arrangement in Each Space and the Like)

The configuration example of the information processing system according to this embodiment is described above. Subsequently, a device arrangement in the first space 100A and the second space 100B and the like is described.

Figure 2:
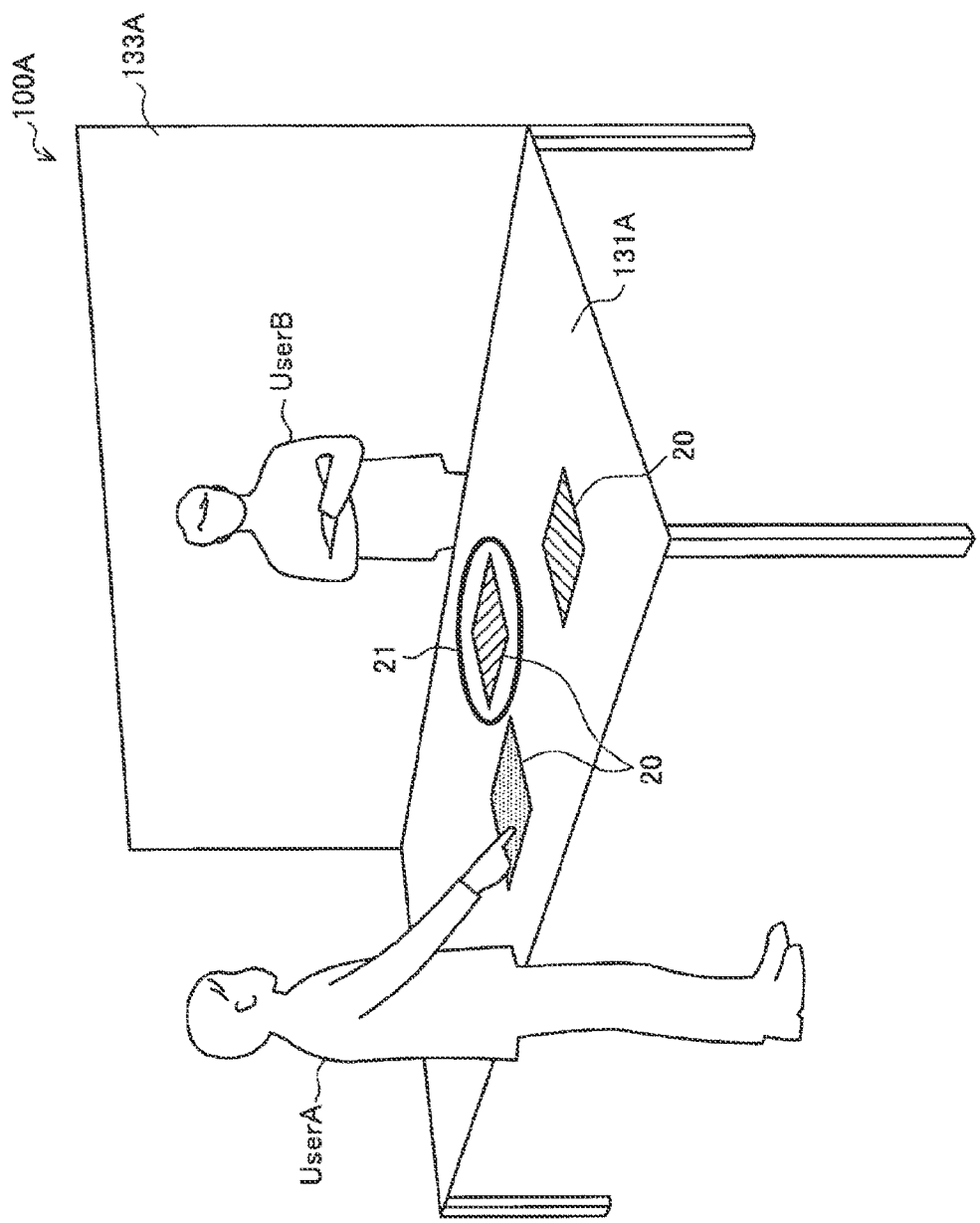
FIG. 2 is a view for illustrating a device arrangement and the like in a first space 100A and a second space 100B.
Figure 3:
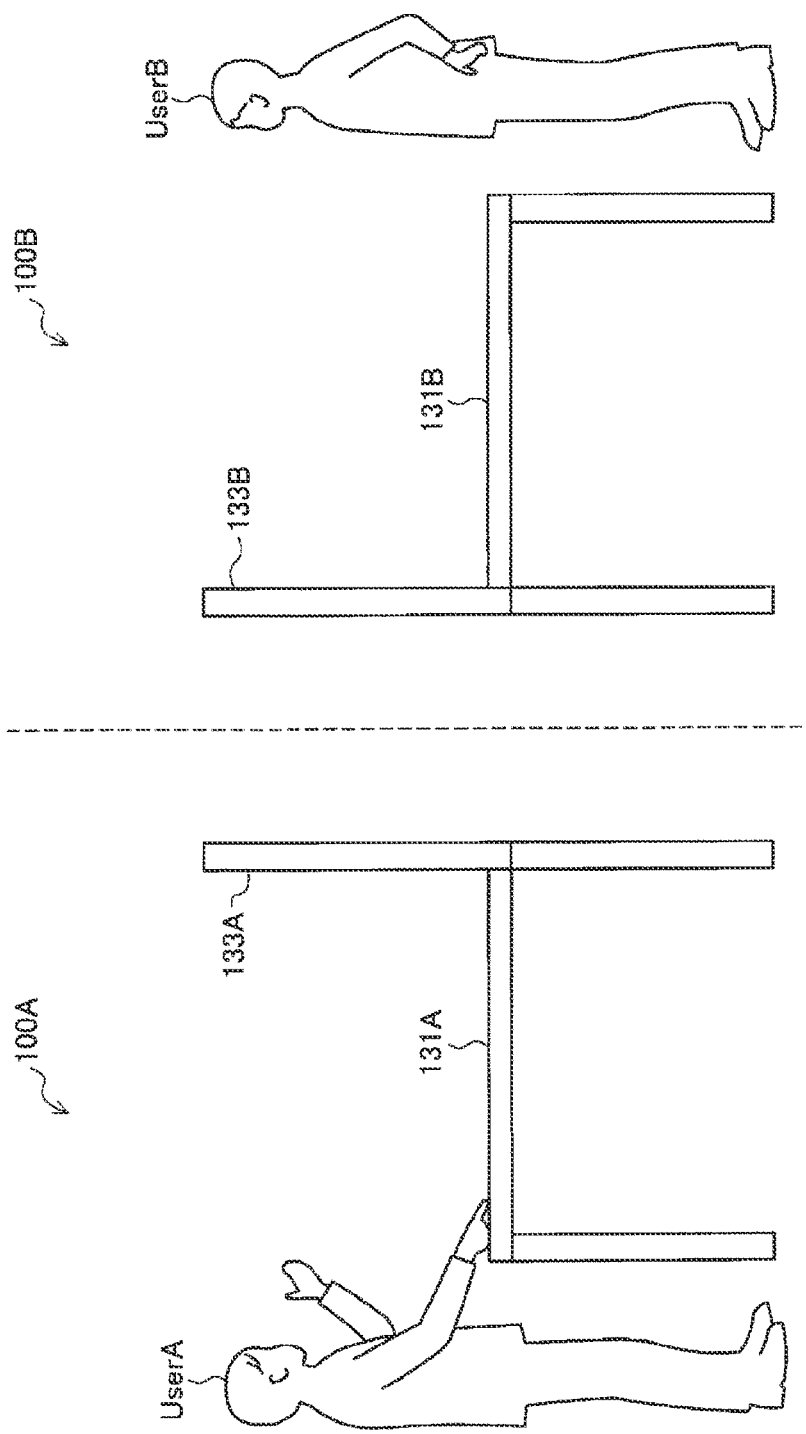
FIG. 3 is a view for illustrating a device arrangement and the like in the first space 100A and the second space 100B.

When the device arrangement in the first space 100A and the like is more specifically described, in the first space 100A, for example, as illustrated in FIG. 2, a user A (first user) is present, and a table display 131A (second display), a display surface of which is provided on a top panel portion of a table (table used as a working table), located substantially parallel to a ground surface, and a window display 133A (first display) provided substantially perpendicular to one end on the table display 131A, a display surface of which is located substantially perpendicular to the ground surface, are provided as an example of the output device group 130. Furthermore, in the second space 100B, as illustrated in FIG. 3, a user B (second user) is present, and the table display 131A, the window display 133A and the like are arranged basically as in the first space 100A. In order to avoid redundant description, the first space 100A is described hereinafter as an example. Note that, although FIG. 3 illustrates a state in which each user is standing, the posture of each user is not limited to this. For example, each user may be sitting on a chair.

The window display 133A in the first space 100A displays the user B and another object (which may include the table display 131B and the like in the second space 100B) present in the second space 100B. Then, the window display 133A has an area large enough for the user A to recognize a state of the second space 100B well (lateral width and longitudinal width equal to or greater than a predetermined length), and displays the user B and another object in real time at substantially the same scale as the first space 100A (in other words, the actual scale or the actual size) and at substantially the same height (in other words, in a state in which ground levels are aligned).

Figure 4:
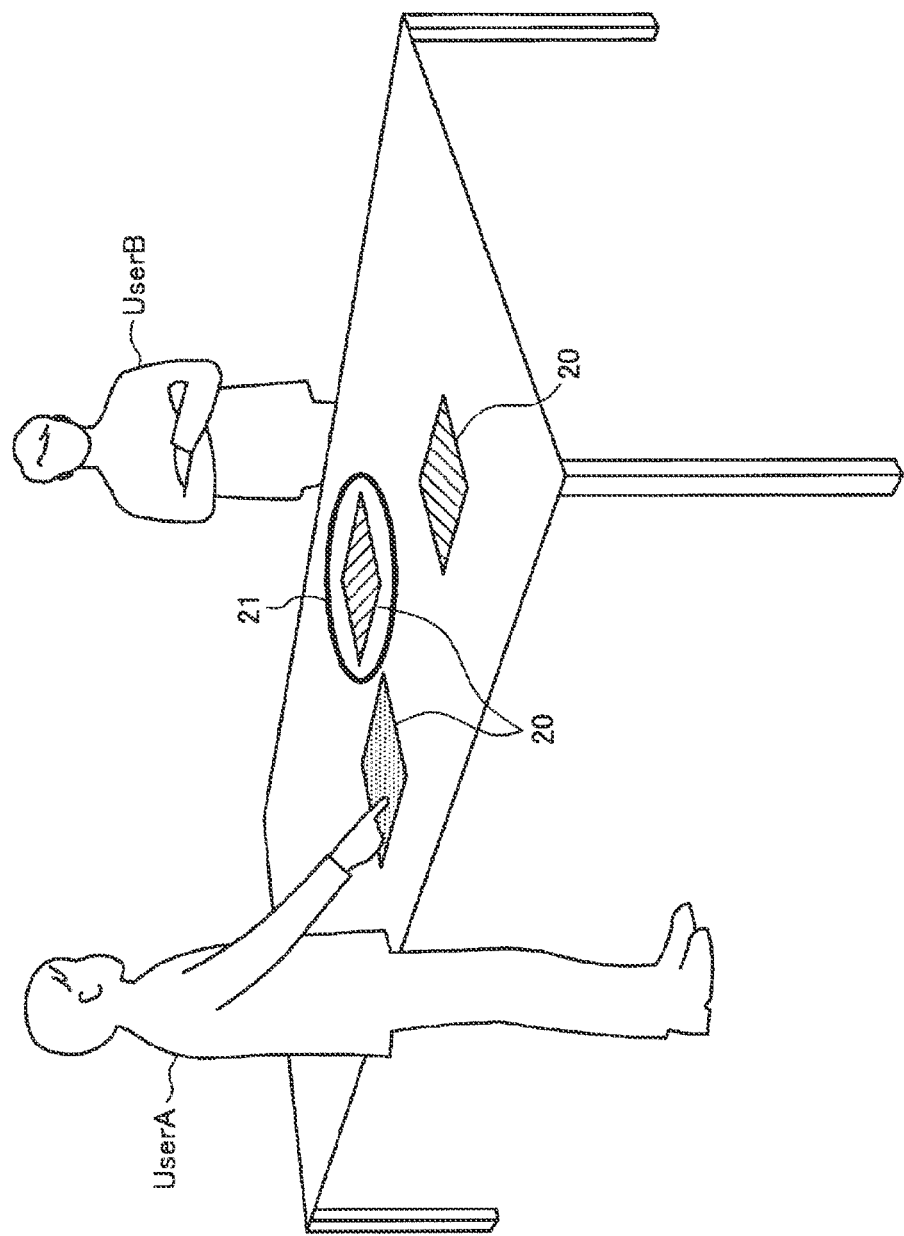
FIG. 4 is a view for illustrating a virtual space generated by a server device 200.

More specifically described, the server device 200 analyzes the various types of input information from the client device 110A or the client device 110B to obtain the first physical information of the user A or the second physical information of the user B, and the first environmental information regarding the object present in the first space 100A or the second environmental information regarding the object present in the second space 100B, and generates the virtual space on the basis of the physical information or the environmental information (or at least the physical information). For example, as illustrated in FIG. 4, the server device 200 generates the virtual space which reproduces a scene of a conversation between the user A and the user B across a table (table corresponding to the table display 131). Then, the server device 200 cuts out partial information of the virtual space and provides the same to the client device 110A, and the window display 133A and the table display 131A obtain the information via the client device 110 to display, so that the user A may feel as if he/she is located in the same space as the user B.

More specifically described, for example, in a case where only a face portion of the user B is displayed in an enlarged or reduced manner on the display (as in the conference system), a display content is far from the reality, so that the user A cannot feel as if he/she is located in the same space as the user B. In contrast, as described above, in a case where the user B and the like is displayed in real time on the window display 133A having a large area at substantially the same scale and at substantially the same height, the display content is realistic, so that the user A may feel as if he/she is located in the same space as the user B. Especially, by displaying the user B and the like in real time at substantially the same scale and at substantially the same height, the user A may feel as if he/she has eye contact with the user B. Note that, the server device 200 does not need to allow the display to display a video completely conforming to the virtual space, and may allow the display to display an appropriately changed video. For example, in a case where a situation in which the eye contact between the user A and the user B is difficult occurs, the server device 200 may change a display position and the like of the video on the display. Furthermore, in order to reproduce the reality, the server device 200 may provide information (for example, an image with effect, an image combined with another image and the like) obtained by editing the input information (for example, the captured image obtained by the camera 123 and the like) obtained by each input device group 120 (for example, the camera 123 and the like) to the client device 110.

Figure 5:
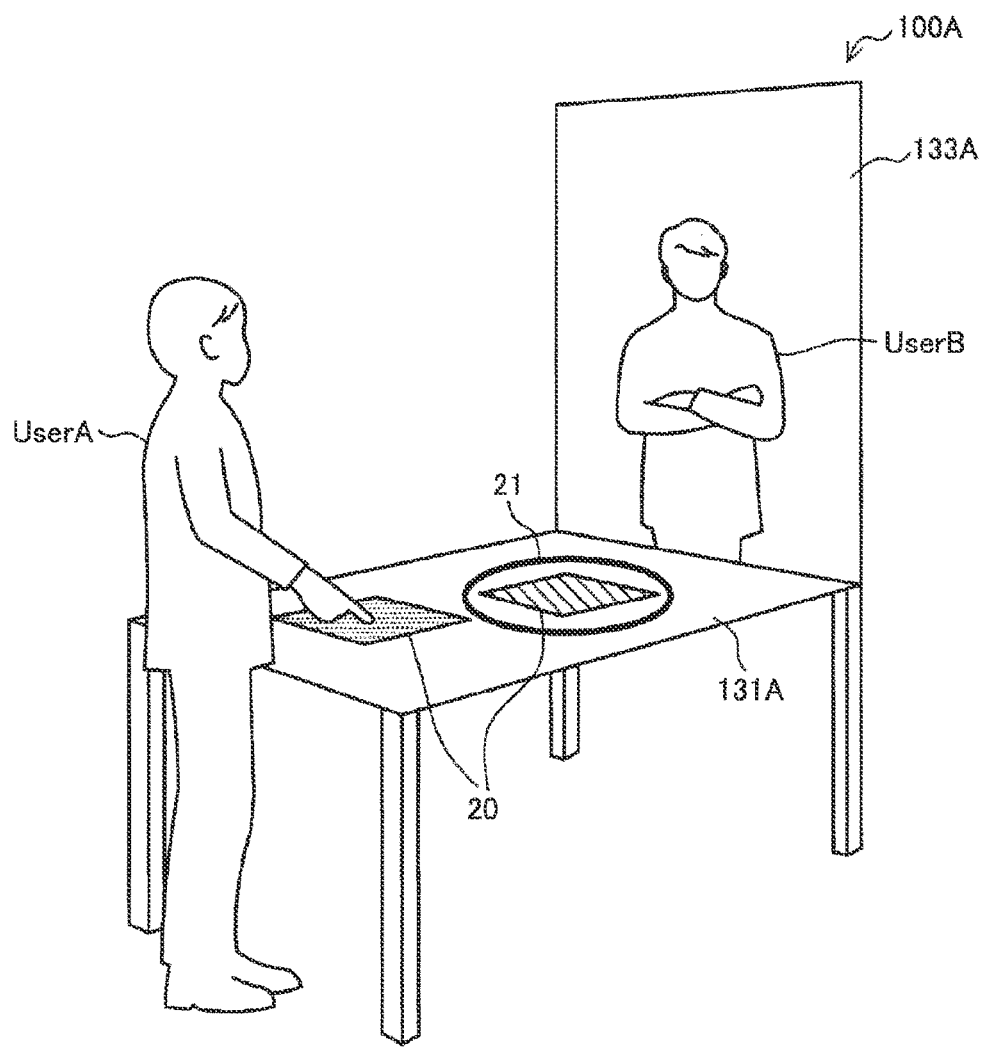
FIG. 5 is a view for illustrating a variation of a device arrangement and the like in the first space 100A and the second space 100B.

Note that, as illustrated in FIG. 5, the window display 133A or the table display 131A having a smaller lateral width than that in FIG. 2 may be used. In this case also, for example, by increasing the longitudinal width of the window display 133A, the user A may recognize the state in the second space 100B well, and therefore, the user A may feel as if he/she is located in the same space as the user B as in the description above. Furthermore, the window display 133A may display a video after being subjected to arbitrary image processing (for example, background color change processing, blurring processing and the like) capable of emphasizing that both the users are located in the same space.

As illustrated in FIGS. 2, 5 and the like, a display image 20 is displayed on the table display 131. The display image 20 is a display object illustrating an interaction from an application, and is, for example, a still image, a moving image (video), various UIs such as a menu screen or a control screen and the like. Furthermore, the display image 20 may be a two-dimensional image or a three-dimensional image. Since an operation input by the user to the display image 20 is detected by various sensors, the user may perform various operation inputs to the display image 20 by bringing an operation body, for example, a hand into contact with or closer to move on the display image 20. For example, the user may allow the table display 131 to display a freely described content by tracing the table display 131 with a finger (in the drawing, a display image 21 having a circular shape is generated by free description).

The operation input to the display image 20 (or the display image 21) on the table display 131 may be detected by, for example, the input device group 120 such as a touch sensor provided on the table display 131, a depth camera, a thermo camera, an RGB camera, or an ultrasonic sensor provided around. For example, the server device 200 obtains a position and depth information (in other words, three-dimensional information) of the hand and finger of the user located on a display screen of the table display 131 by analyzing the captured image and depth information obtained by the input device group 120, and detects contact or approximation of the hand of the user to the table display 131 in a height direction or separation of the hand from the table display 131.

In this specification, an object (the display image 20 and the display image 21) which may be operated by both the user A and user B is referred to as a "shared object". The server device 200 may reflect the operation input from the user to the shared object displayed on the table display 131 on one side in the corresponding shared object displayed on the table display 131 on the other side (in real time), thereby further improving convenience in collaborative work. More specifically, for example, when the same shared object is displayed in the same arrangement on the table display 131A and the table display 131B, in a case where the user A moves the shared object put on the table display 131A, the server device 200 moves the corresponding shared object on the table display 131B as well.

(2.3. Type of Operation Mode)

In the information processing system according to this embodiment, a plurality of operation modes is provided regarding an audiovisual effect provided to the user A (first user) and the user B (second user). Then, in a case where a predetermined trigger occurs, the server device 200 may switch the operation mode to change the audiovisual effect provided to the user A and the user B, thereby allowing the user A and the user B to perceive a mutual positional relationship (and posture).

Regarding transmission of techniques and skills, it is more useful for the instructor and student to conduct bidirectional communication while appropriately changing the mutual positional relationship. For example, by not only face-to-face lesson between the instructor and the student but also appropriate technique or skill demonstration and the like by the instructor near the student after moving to the position of the student, an understanding level of the student is improved.

Figure 6:
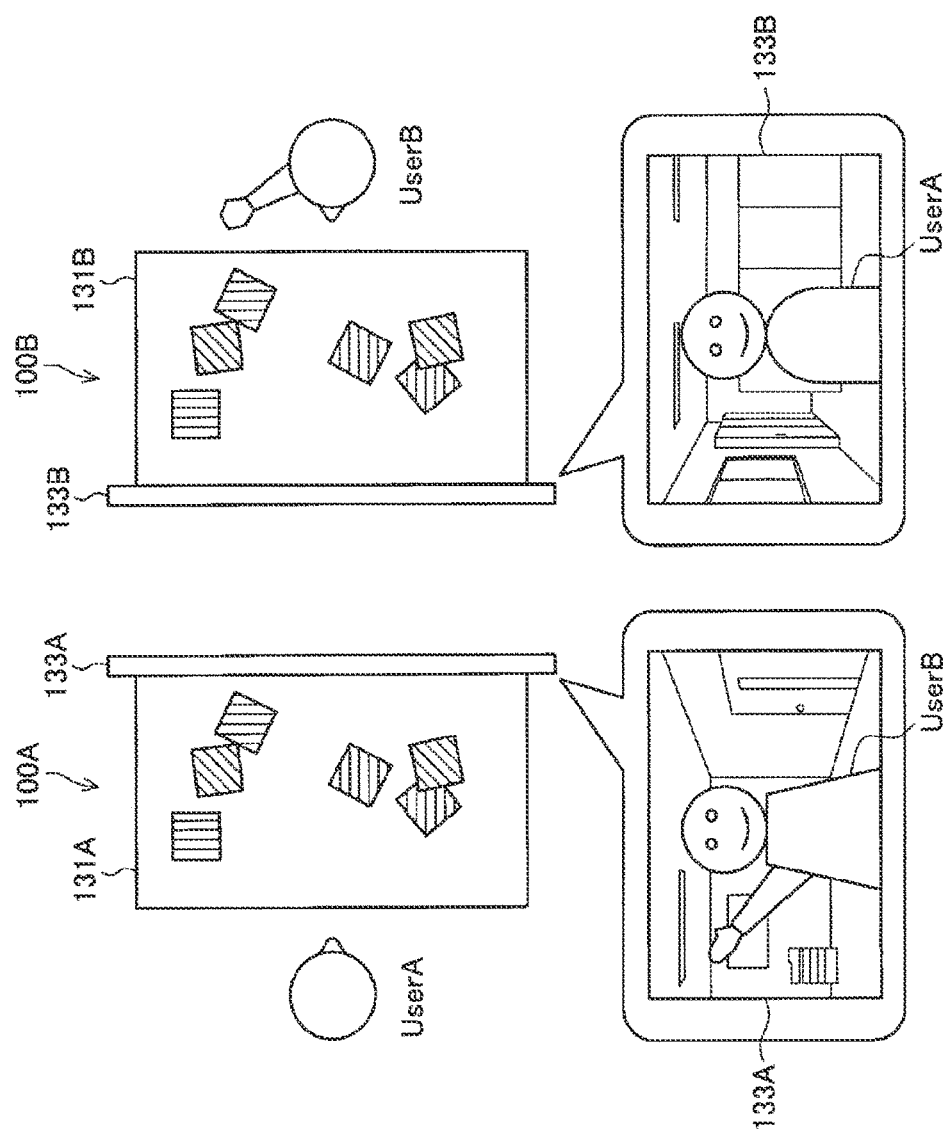
FIG. 6 is a view for illustrating a facing mode.

Therefore, subsequently, a type of the operation mode used in the information processing system according to this embodiment is described. For example, as illustrated in FIG. 6, an operation mode (hereinafter, referred to as a "facing mode" for convenience) in which the user A and the user B are located face-to-face with each other, and an output (for example, display by the display, voice output by the speaker and the like) is performed according to an actual positional relationship may be provided. In the facing mode, the server device 200 allows each display to display a different image generated by editing the captured image obtained by the camera 123 in each space (for example, an image with effect, an image combined with another image and the like). Note that, as described above, the server device 200 may allow each display to display the information cut out from the virtual space generated on the basis of the physical information or the environmental information (note that, the server device 200 may appropriately process the information cut out from the virtual space). As a result, as illustrated in FIG. 6, in a case where the user B raises his/her right hand, the facing user A looks that the user B raises his/her right hand. The facing mode may be applied, for example, in a case where the instructor conducts a face-to-face lesson with the student and the like.

Figure 7:
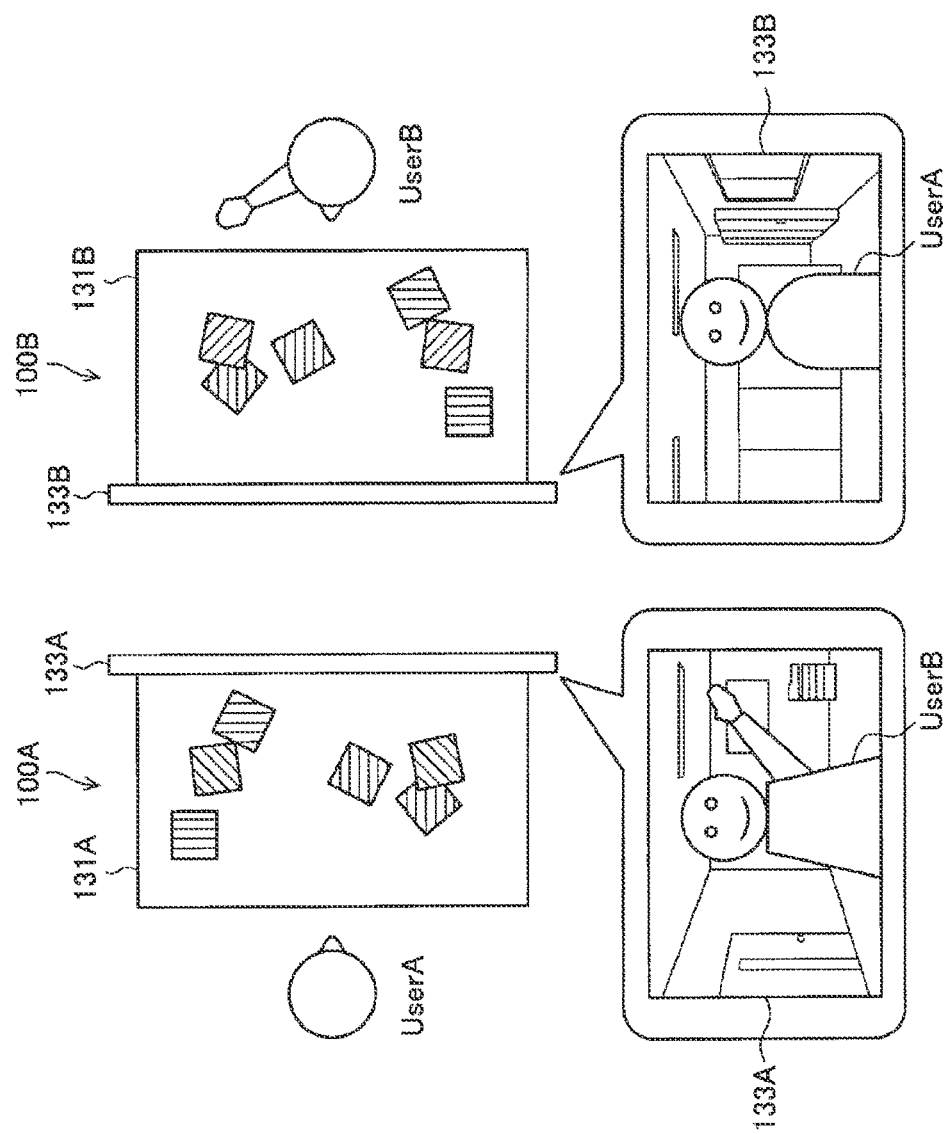
FIG. 7 is a view for illustrating a right-left reversed mode.

Furthermore, as illustrated in FIG. 7, an operation mode in which the user A and the user B are located face-to-face with each other and an output is performed in a right-left reversed state from an actual positional relationship (hereinafter, referred to as a "right-left reversed mode" for convenience) may be provided. In the right-left reversed mode, the server device 200 allows each display to display a different image generated by editing the captured image obtained by the camera 123 in each space (for example, an image obtained by right-left reversing the captured image, an image, with effect, an image combined with another image and the like). Note that, as described above, the server device 200 may cut out partial information of the virtual space generated on the basis of the physical information or the environmental information and allow each display to display the information in a state in which the positional relationship is right-left reversed. As a result, as illustrated in FIG. 7, in a case where the user B raises his/her right hand, the facing user A looks that the user B raises his/her left hand. As the facing mode, the right-left reversed mode may also be applied, for example, in a case where the instructor conducts a face-to-face lesson with the student and the like.

Figure 8:
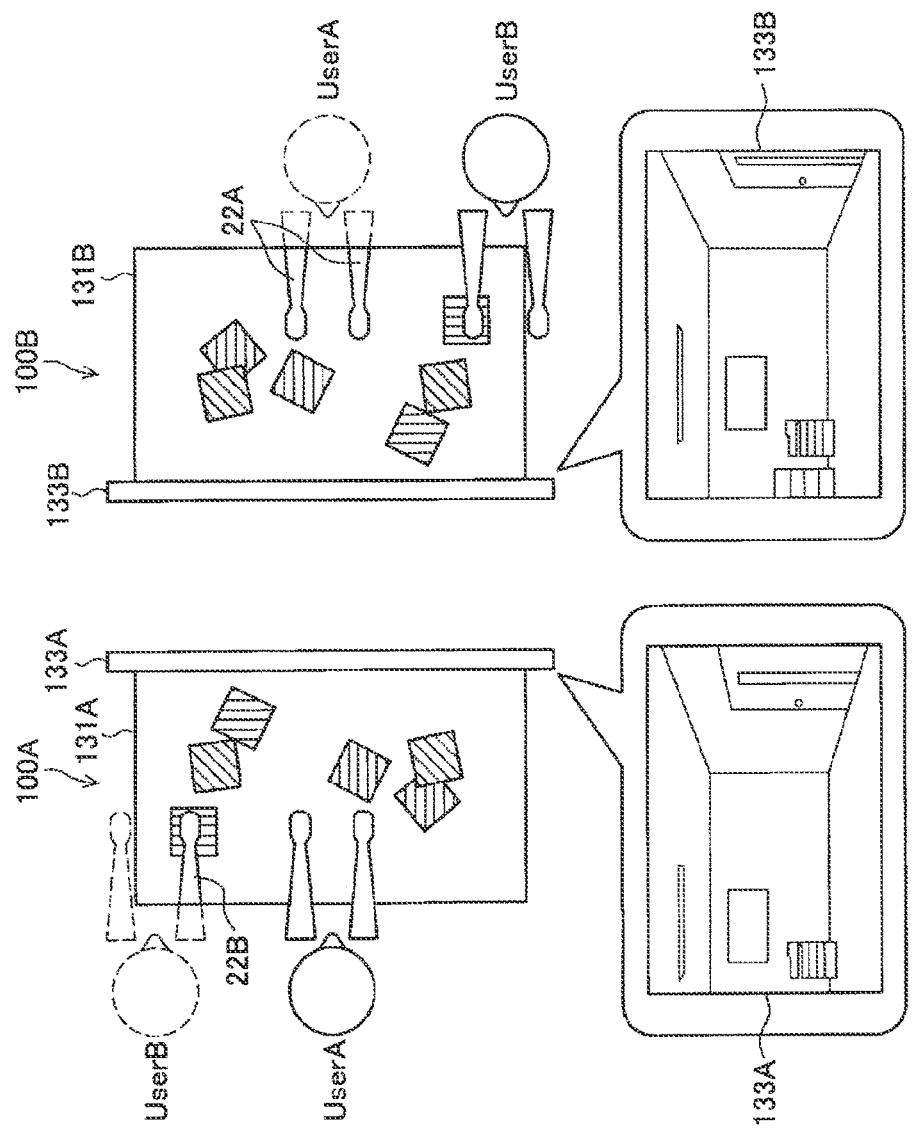
FIG. 8 is a view for illustrating a side-by-side mode.

Furthermore, as illustrated in FIG. 8, an operation mode in which the user A and the user B face substantially in the same direction and an output is performed in a state in which they are located side by side (hereinafter, referred to as a "side-by-side mode" for convenience) is provided. In the side-by-side mode, for example, a display image 22B of a hand of the user B (an image of a right hand of the user B in the example in FIG. 8) is displayed to the left of the user A on the table display 131A in the first space 100A, so that the user A may perceive that the user B is located to the left. In contrast, since a display image 22A of a hand of the user A (an image of both hands of the user A in the example in FIG. 8) is displayed to the right of the user B on the table display 131B in the second space 100B, so that the user B may perceive that the user A is located to the right. The side-by-side mode may be applied, for example, in a case where the instructor moves to the side of the student to show a work sample (or vice versa) and the like.

Figure 9:
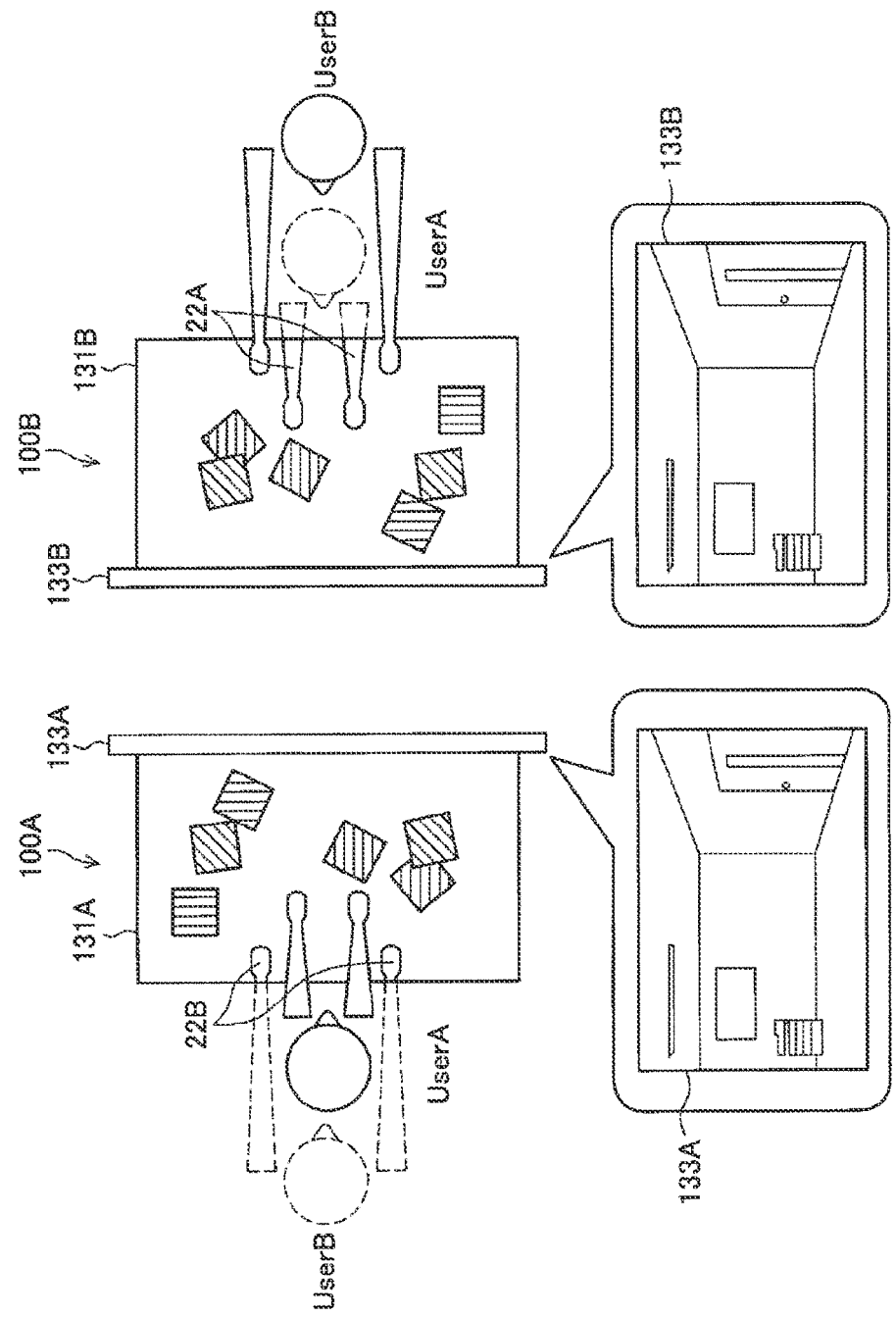
FIG. 9 is a view for illustrating a possession mode.

Furthermore, as illustrated in FIG. 9, an operation mode in which the user A and the user B face substantially in the same direction and an output is performed in a state in which one is located behind so as to cover the other (this causes a feeling as if one possesses the other, so that this is hereinafter referred to as "possession mode" for convenience) is provided. In the possession mode, for example, the display image 22B of the hand of the user B (an image of both hands of the user B in an example in FIG. 9) is displayed on both sides of the user A on the table display 131A in the first space 100A, so that the user A may perceive that the user B is located behind so as to cover the user A (note that, it is not required that the image of both the hands of the user B are displayed on both sides of the user A). In contrast, since the display image 22A of the hand of the user A (an image of both the hands of the user A in the example in FIG. 9) is displayed between both the hands of the user B on the table display 131B in the second space 100B, so that the user B may perceive that he/she is located behind so as to cover the user A. Note that, depending on the positional relationship between the user A and the user B, a back head of the user A may be displayed on the table display 131B in the second space 100B. The possession mode may be applied, for example, in a case where the instructor shows a work sample in a state of possessing the student from behind (in other words, in a case where the instructor possesses the student), in a case where the student moves in behind the instructor to check the work of the instructor (in other words, in a case where the student possesses the instructor) and the like.

Note that, although display control on the display is mainly described in the description above (FIGS. 6 to 9), the server device 200 may control devices other than the display included in the output device group 130, thereby allowing the user A and the user B to perceive the positional relationship between each other (and posture) in each operation mode. For example, the server device 200 may control the speaker included in the output device group 130 to localize a sound image in a real space, thereby allowing the user A and the user B to perceive the positional relationship between each other (and posture).

Furthermore, the types of the operation mode provided in the information processing system according to this embodiment are not limited to the description above. More specifically, the server device 200 may appropriately newly establish or change the operation mode on the basis of a change in positional relationship between the users.

(2.4. Switch of Operation Mode)

The types of the operation mode used in the information processing system according to this embodiment are described above. Subsequently, switch of the operation modes is described.

In a case where a predetermined trigger occurs, the server device 200 interlocks at least one device provided in the first space 100A or the second space 100B (for example, the display, the speaker and the like) by switching the operation mode described above.

Here, it is assumed that the "predetermined trigger" used for switching the operation mode is a trigger caused by at least any one of the user A (first user) or the user B (second user). For example, the predetermined trigger includes a predetermined action by the user A or the user B (for example, an action of standing up from the chair, an action of moving while sitting on the chair or the like), a predetermined statement (for example, the statement of "I'll go there.", "Please come here." or the like), a predetermined operation input (for example, touch on the table display 131, press of a button or the like) or the like. Note that, a content of the predetermined trigger is not limited to them.

When switching the operation mode, the server device 200 may give each user a feeling that the positional relationship (and posture) between the user A and the user B changes in the same space by interlocking each device as described above. That is, the user A and the user B may freely and naturally change their positional relationship (and posture).

Figure 10:
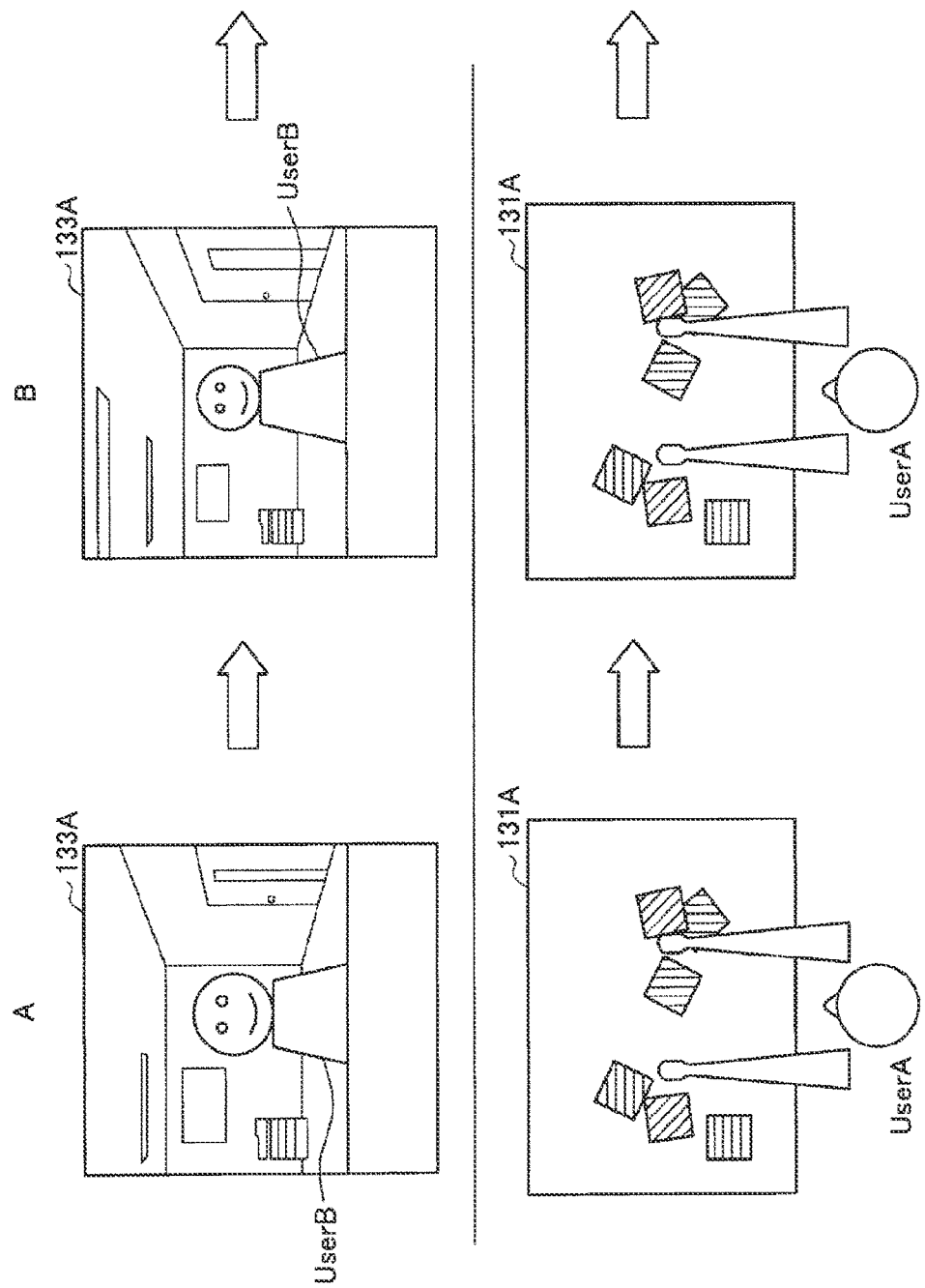
FIG. 10 is a view for illustrating a specific example of interlock of each device when switching an operation mode.
Figure 11:
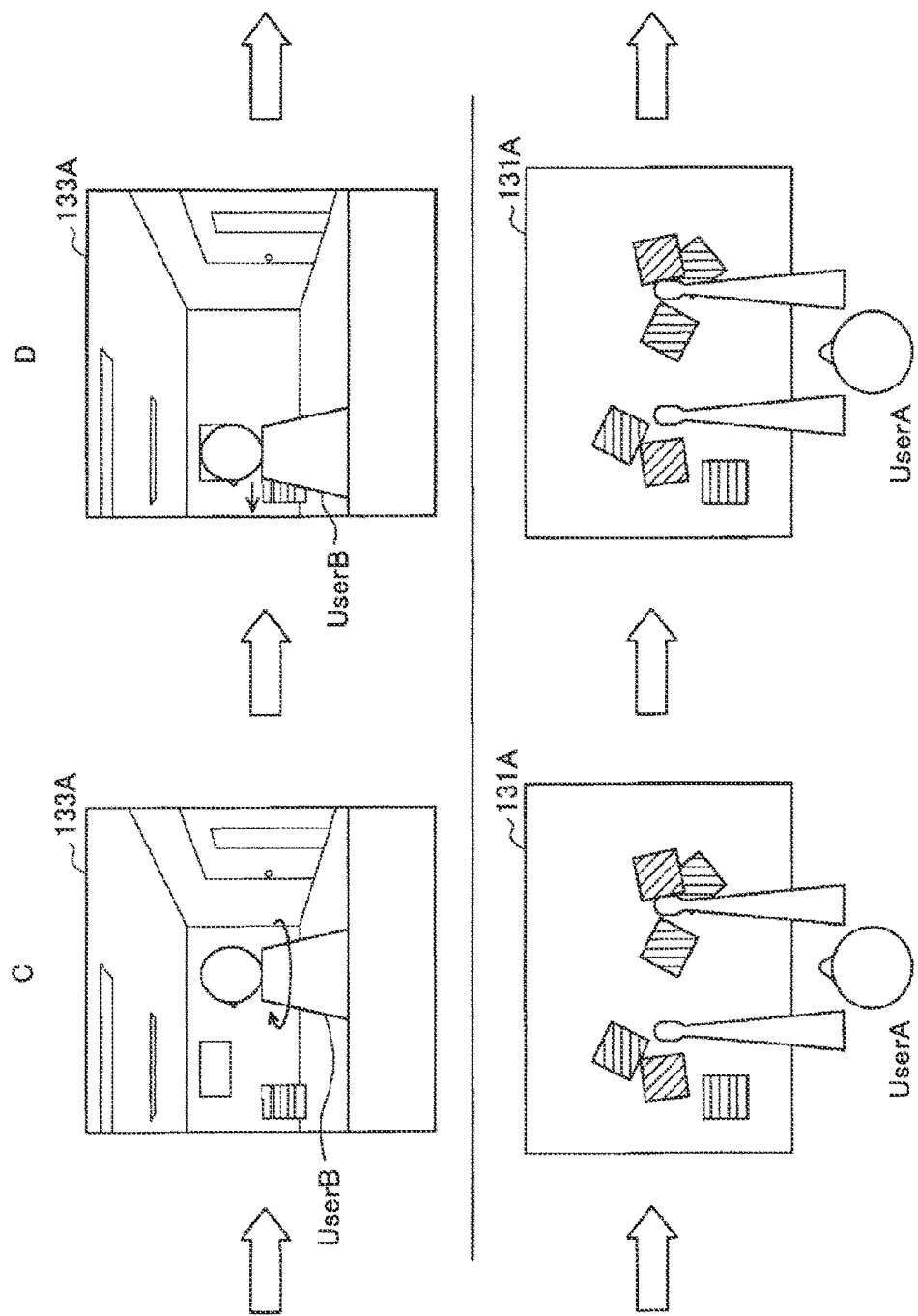
FIG. 11 is a view for illustrating a specific example of interlock of each device when switching an operation mode.
Figure 12:
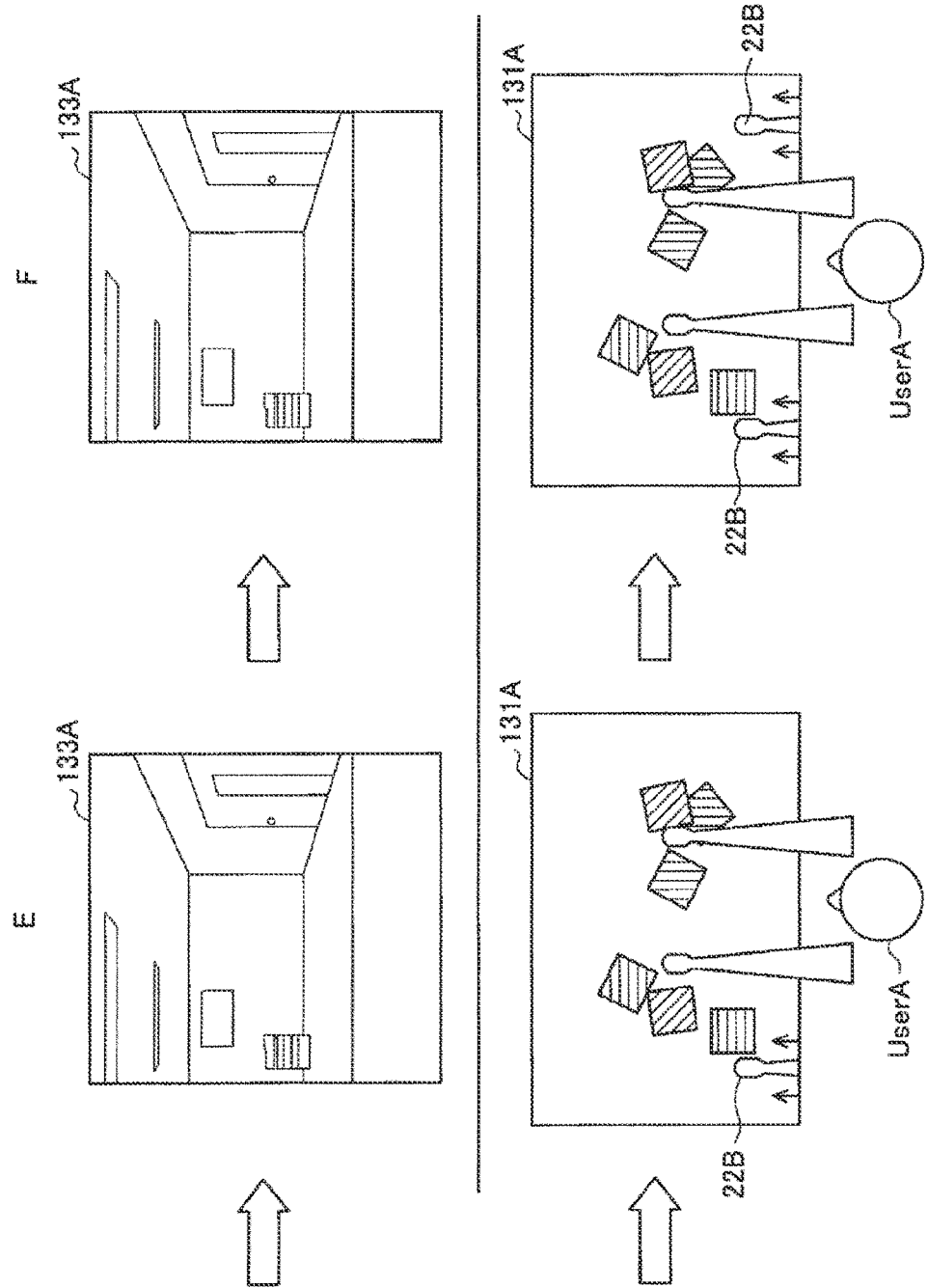
FIG. 12 is a view for illustrating a specific example of interlock of each device when switching an operation mode.

Subsequently, with reference to FIGS. 10 to 12, a specific example of interlock of each device when switching the operation mode is described. FIGS. 10 to 12 are views illustrating a specific example of a display operation of the window display 133A and the table display 131A when switching from the facing mode to the possession mode.

For example, the window display 133A in A of FIG. 10 displays the user B sitting on a chair, and the table display 131A displays the shared objects shared by the user A and the user B. As a result, the user A perceives that he/she faces the user B across the table on which the shared object is put.

Thereafter, the server device 200 which detects an action that the user B stands up from the chair and the like as the predetermined trigger performs a series of operation mode switch processing. For example, the server device 200 allows the window display 133A to display the user B while pulling (reducing a size of) the user B as illustrated in B of FIG. 10. Note that, at that time, the server device 200 may allow the window display 133A to display the user B while blurring an entire window display 133A.

In C of FIG. 11, the server device 200 allows the window display 133A to display the user B in a state in which the user B is laterally rotated with respect to the user A. In D of FIG. 11, the server device 200 allows the user B to go straight out of the window display 133A. Note that, also in C and D of FIG. 11, the server device 200 may allow the window display 133A to display the user B while blurring the entire window display 133A.

In E of FIG. 12, the server device 200 allows the table display 131 to display the display image 22B of the hand of the user B (in this example, the left hand) located on a side to which the user B moves (the left side in this example) from a near side after a lapse of time required for the user B to move in behind the user A. Thereafter, in F of FIG. 12, the server device 200 allows the table display 131 to display the display image 22B of the other hand (in this example, the right hand) from a right near side of the user A.

By the series of display operations illustrated in FIGS. 10 to 12, the server device 200 may provide to each user the feeling that the user B comes around from the left of the user A to move in behind the user A.

Subsequently, with reference to FIGS. 13 to 15, a variation of the display operations of the window display 133A and the table display 131A when switching from the facing mode to the possession mode is described.

Figure 13:
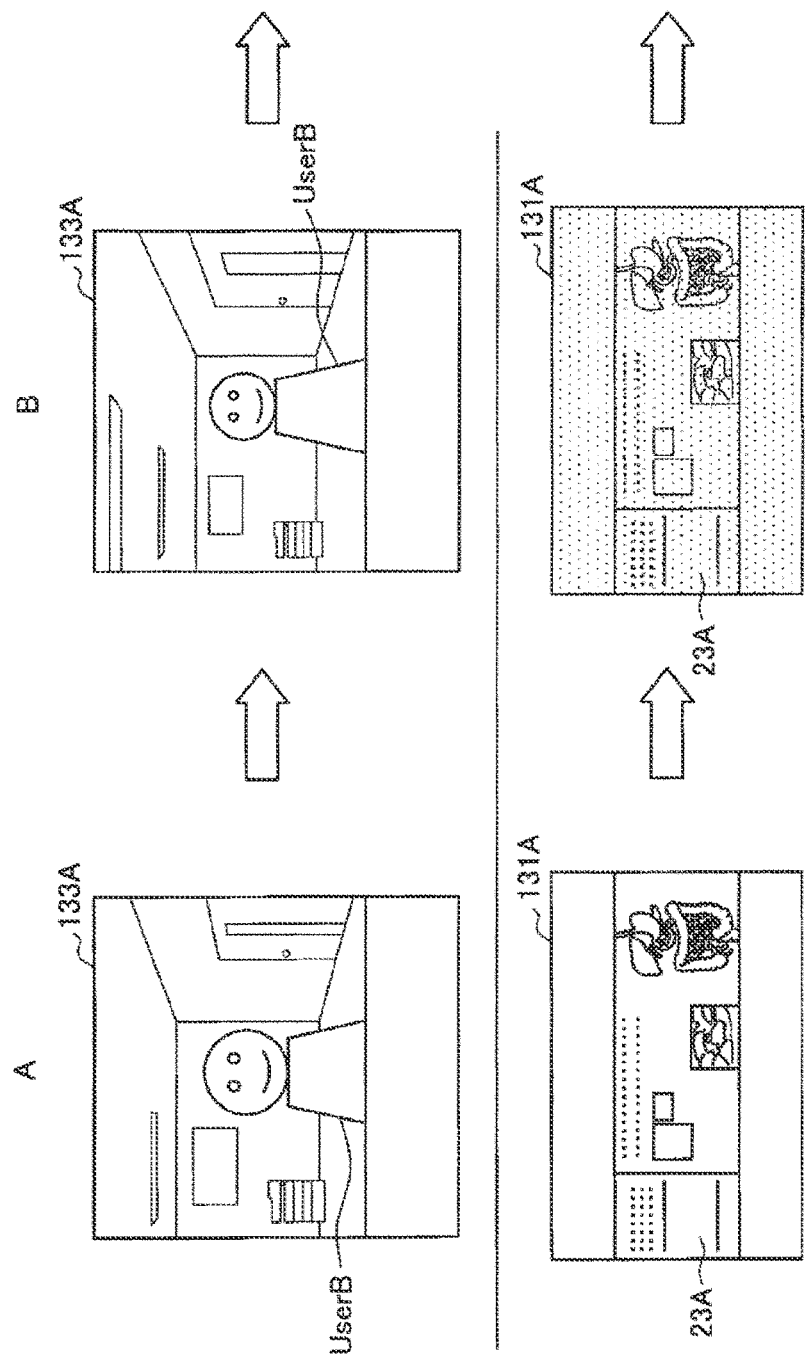
FIG. 13 is a view for illustrating a specific example of interlock of each device when switching an operation mode.

As illustrated in FIG. 13, the table display 131A displays not the shared object shared by the user A and the user B but a display image 23A of a document used by the user A (in other words, the documents used by the user A and the user B are different). Others are similar to those in A of FIG. 10.

Thereafter, the server device 200 which detects an action that the user B stands up from the chair and the like as the predetermined trigger performs a series of operation mode switch processing. For example, the server device 200 gradually changes the display image 23A displayed on the table display 131A to black (blackout) as illustrated in B of FIG. 13. Others are similar to those in B of FIG. 10.

Figure 14:
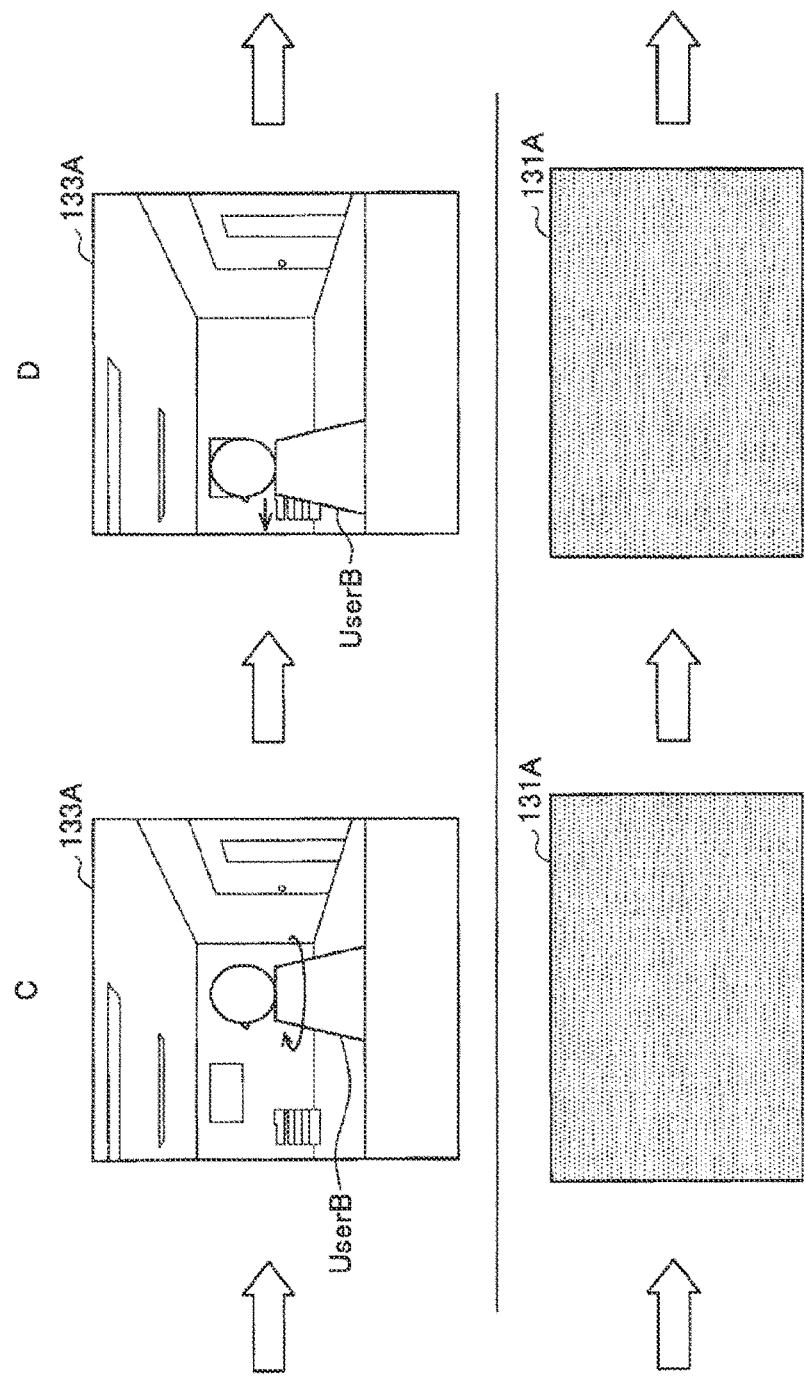
FIG. 14 is a view for illustrating a variation of interlock of each device when switching an operation mode.

In C and D of FIG. 14, the server device 200 puts the table display 131A into a completely blacked out state. Others are similar to those in C and C of FIG. 11. In E of FIG. 15, the server device 200 allows the table display 131 to display a display image 23B of the document used by the user B from a side to which the user B moves (in this example, from upper left) after a lapse of time required for the user B to move in behind the user A. Thereafter, in F of FIG. 15, the server device 200 allows to display the display image 23B on an entire table display 131.

Figure 15:
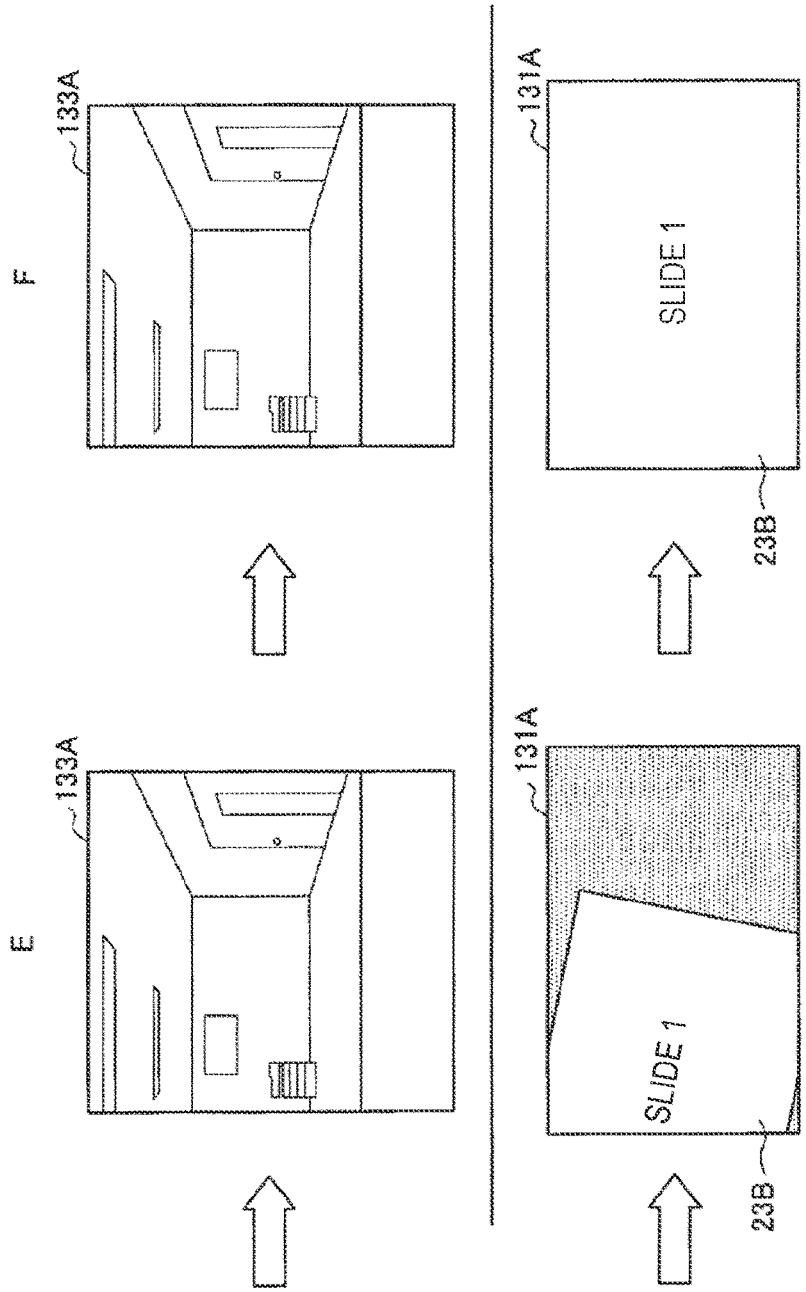
FIG. 15 is a view for illustrating a variation of interlock of each device when switching an operation mode.

By the series of display operations illustrated in FIGS. 13 to 15, the server device 200 may provide to each user the feeling that the user B comes around the user A from the left to move in behind the user A, and puts the document used by the user B on the table of the user A. Then, thereafter, the user B may transmit information and the like to the user A by using the display image 23B of the document.

In the examples FIGS. 10 to 15, the server device 200 appropriately processes the information (for example, an image with effect, an image combined with another image and the like) obtained by editing the input information (for example, the captured image obtained by the camera 123 and the like) obtained by each input device group 120 (for example, the camera 123 and the like) or the information cut out from the virtual space and allows each device (window display 133, table display 131 and the like) to output the same, thereby providing to each user the feeling that the positional relationship (and posture) of the user A and the user B changes in the same space. More specifically, the server device 200 allows each device to output information obtained by applying various types of image processing (for example, reduction processing, blurring processing, rotational processing, and position change (movement) processing) on the information obtained by editing the input information obtained by each input device group 120 or the information cut out from the virtual space (for example, the image of the user B). That is, one of major points of the present disclosure is to provide to each user the feeling that the positional relationship (and posture) of each user changes in the same space, and as a method thereof, the server device 200 may allow each device to output the information obtained by editing the input information obtained by each input device group 120 or the information cut out from the virtual space as is, or after processing the information. Note that, the method of processing these pieces of information is not limited to the above-described example.

Furthermore, the server device 200 may allow each device to output information other than the information obtained by editing the input information obtained by each input device group 120 or information other than the information cut out from the virtual space. For example, in a case where the server device 200 holds the physical information of each user and arbitrary object information (for example, information regarding a characteristic of a body of each user and arbitrary object including shape, color and the like), this may edit a displayed content of each display by using the information. As a result, for example, the server device 200 may allow each display to display video completely different from the reality by superimposing a user in a desired state (posture) or a desired object on the virtual space after deleting each user from the virtual space which reproduces the reality. There is a possibility that the feeling that each user is present in the same space cannot be sufficiently created only by the information of the virtual space which reproduces the reality. In that respect, the server device 200 may control the output of each device by using the information other than the information obtained by editing the input information obtained by each input device group 120 or the information other than the information cut out from the virtual space as described above, thereby appropriately deleting a factor which impedes the feeling that each user is present in the same space.

(2.5. Variation of Information Transmission Using Each Device)

The switch of the operation mode is described above. Subsequently, a variation of information transmission using each device is described.

Regarding the transmission of techniques and skills, it may be said that it is more useful for the instructor and student to perform information transmission while directly having contact with each other. For example, when the instructor provides guidance on how to move the body and the like while directly touching the student, a degree of understanding of techniques and skills or the student is improved.

Therefore, the information processing system according to the present disclosure may provide to each user not only the feeling that the positional relationship between the respective users changes in the same space as described above, but also the feeling that each user transmits information while having contact with each other.

Figure 16:
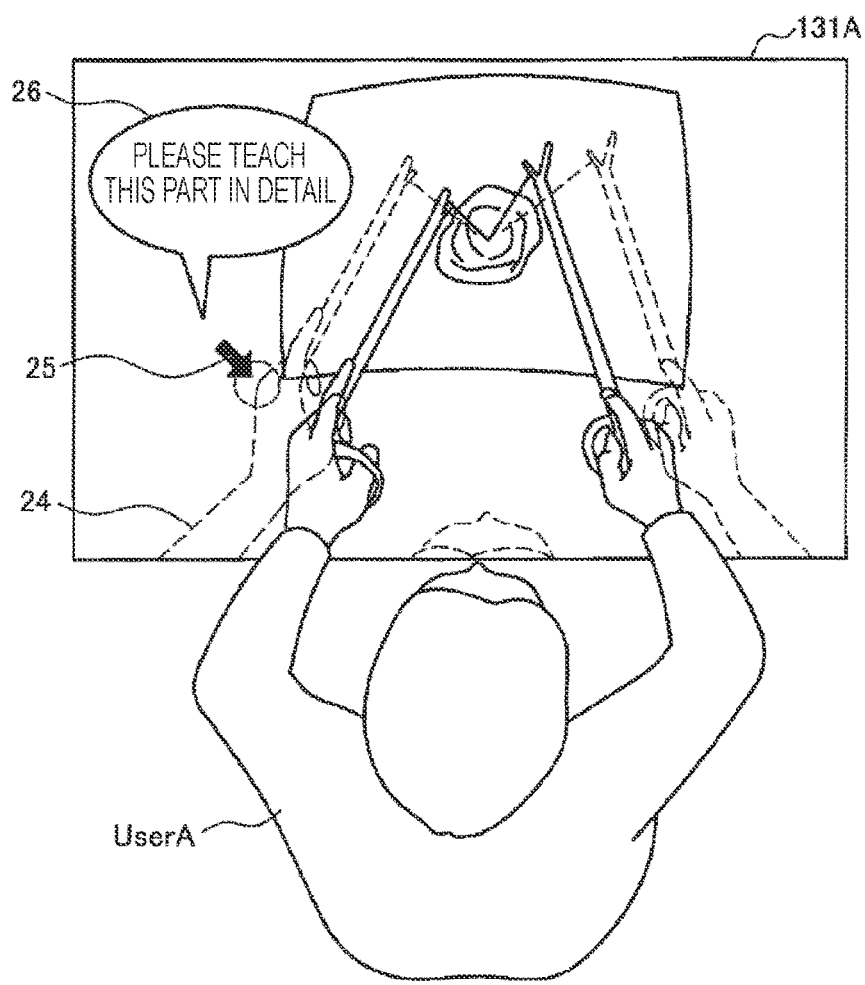
FIG. 16 is a view for illustrating information transmission using each device.

For example, with reference to FIG. 16, a case where the user A (student) receives guidance regarding surgery from the user B (instructor) is described as an example. In the example in FIG. 16, the possession mode in which the user A possesses the user B is set, and a display image 24 of a part of the body of the user B and an educational material used by the user B (tool used in surgery and a surgical target imitating a part of a human body) is displayed on the table display 131A in the first space 100A. The user A undergoes surgery training using the tool held by him/herself and the surgical target displayed on the table display 131A.

At that time, the server device 200 controls at least one device present in the first space 100A or the second space 100B (or at least the second space 100B) on the basis of the input by the user A (first user) (note that, conversely, the server device 200 may control at least one device present in the first space 100A or the second space 100B (or at least the first space 100A) on the basis of the input by the user B (second user)). For example, the user A may perform various inputs using the input device group 120A, thereby allowing the table display 131 the first space 100A or the second space 100B (or at least the second space 100B) to display a display image 25 indicating a part of the display image 24, and a display image 26 of a balloon including a character string (in the example in FIG. 16, a character string "Please teach this part in detail." is included in the balloon). As a result, the user A may obtain a feeling that he/she asks a more detailed question regarding techniques or skills while having direct contact with the user B. Note that, conversely, the user B may transmit an important part to the user A by performing various inputs using the input device group 120B.

Figure 17:
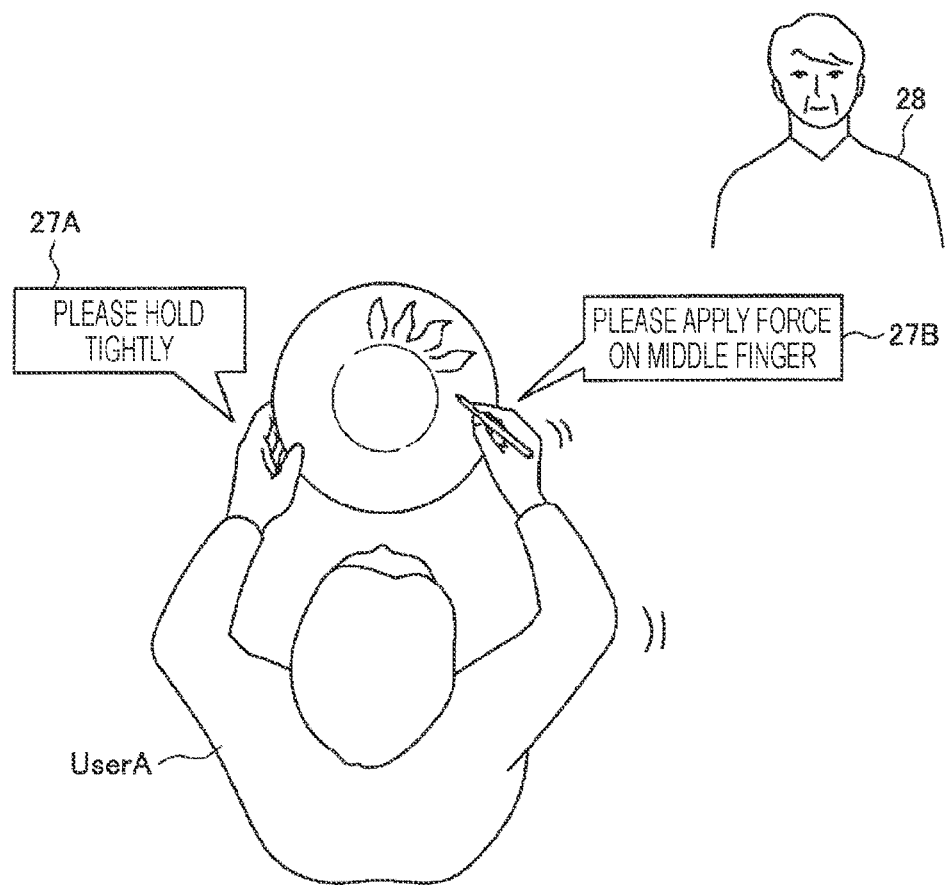
FIG. 17 is a view for illustrating information transmission using each device.

Subsequently, as illustrated in FIG. 17, a case where the user A (student) receives guidance regarding handicrafts from the user B (instructor) is described as an example. In the example in FIG. 17, the possession mode in which the user B possesses the user A is set. Furthermore, it is assumed that the output device group 130A includes a projector which enables projection mapping, and a tactile sense presentation device mounted on the hand of the user A and may present a tactile sense to the hand of the user A.

At that time, the user B may perform various inputs using the input device group 120B to project a display image 27 of a balloon including a character string in a superimposed manner on a part of the body of the user A and the target object, and control the tactile sense presentation device to present various tactile senses to the hand of the user A. For example, in the example in FIG. 17, the user B presents the tactile sense corresponding to the content of each balloon (for example, a tactile sense of holding the target object tight, a tactile sense of bend in the middle finger and the like) while projecting a display image 27A and a display image 27B of a balloon including a character string of "Please hold tightly." or "Please apply force on middle finger.") in a superimposed manner on a part of the body of the user A and the target object. As a result, the user A may obtain a feeling that he/she receives transmission of more detailed information regarding techniques and skills while having direct contact with the user B. Note that, at that time, a different tactile sense corresponding to the tactile sense presented to the user A (for example, different tactile sense occurring when the tactile sense is presented to the user A) may be presented to the user B.

Furthermore, in the example in FIG. 17, a display image 28 illustrating the user B who projects the display image 27 of the balloon is also projected. This allows the user A to intuitively recognize that the projection is performed by the user B. Indication of a source of information in this manner is especially useful in a case where three or more users communicate using the information processing system according to the present disclosure. A specific example of a case where three or more users communicate using the information processing system according to the present disclosure is described later.

Here, it is preferable that the display image indicating a part of each user or the target object (for example, the display image 25 indicating a part of the display image 24 illustrated in FIG. 16, and the display image 27 of the balloon projected in the superimposed manner on a part of the body of the user A or the target object illustrated in FIG. 17) is continuously displayed following the part.

Figure 18:
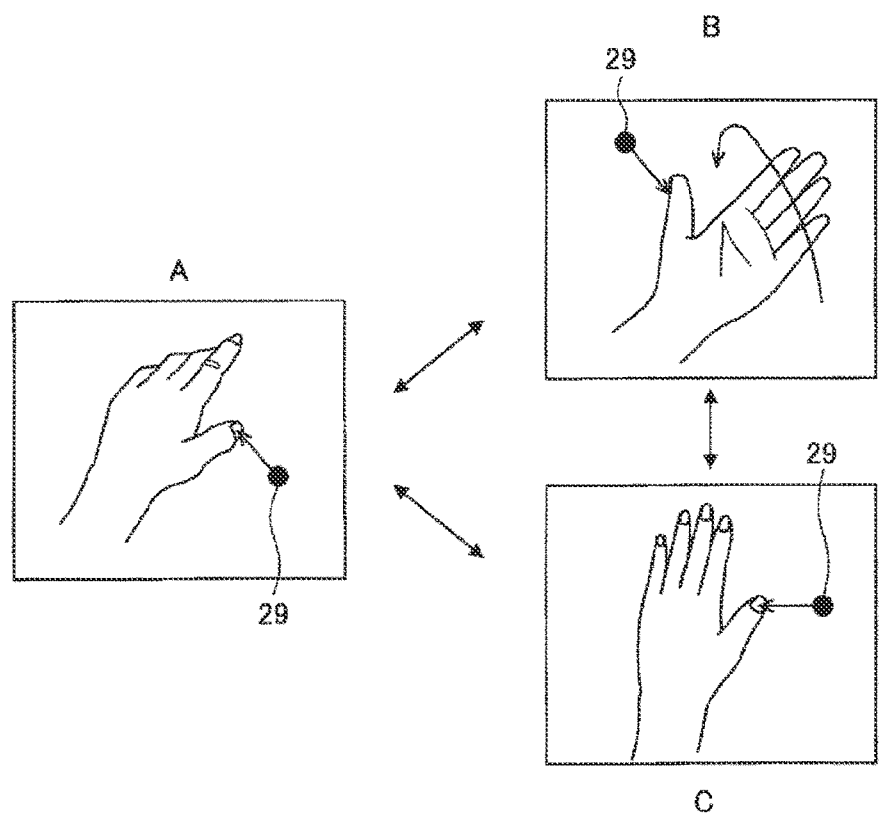
FIG. 18 is a view for illustrating information transmission using each device.

More specifically, in a case where a display image 29 indicating the thumb of the user is displayed, even if the posture of the hand of the user chances as illustrated in A to C of FIG. 18, it is preferable that the display image 29 be continuously displayed so as to follow the change in posture of the hand. As a result, each user may transmit information regarding an important portion from various angles by changing the positional relationship between each other and the posture.

(2.6. Extraction Processing of Real Object from Captured Image)

The variation of the information transmission using each device is described above. Subsequently, extraction processing of a real object from the captured image is described.

Figure 19:
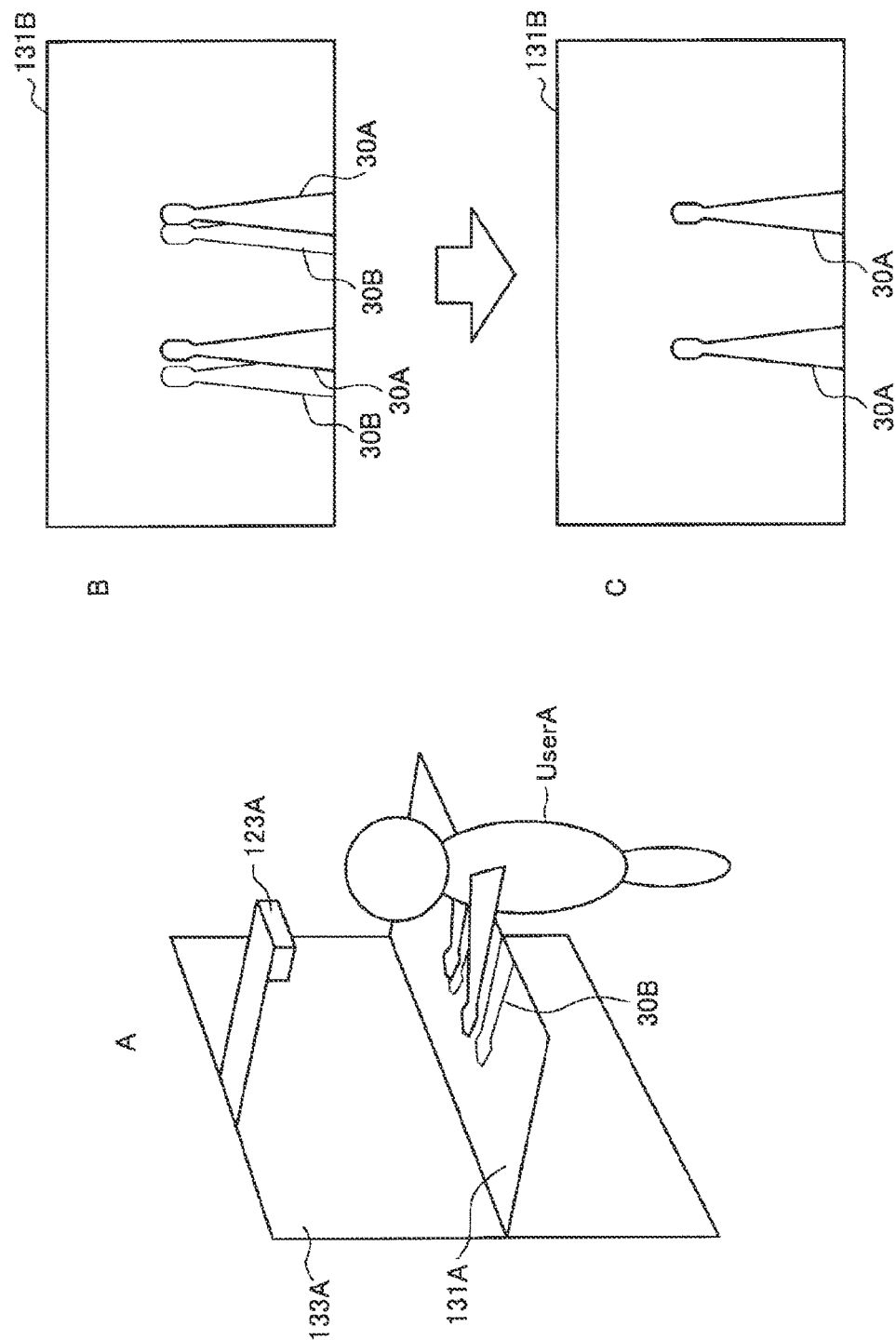
FIG. 19 is a view for illustrating extraction processing of an object from a captured image.

For example, as illustrated in A of FIG. 19, a case where a camera 123A included in the input device group 120A in the first space 100A is installed above the table display 131A in such a mode that an object on the table display 131A may be imaged is considered. In this case, when the server device 200 generates the virtual space by using the captured image captured by the camera 123A as is and reflects a part of the same in the table display 131B in the second space 100B, as illustrated in B of FIG. 19, not only a display image 30A of the hand of the user A but also a display image 30B of the hand of the user B (image capture of the display image 30B displayed on the table display 131A in the first space 100A) is displayed. In this manner, an event that the display image displayed on the table display 131 is displayed again on the table display 131 is infinitely repeated (although not illustrated in B of FIG. 19 for convenience, the display image 30A and the display image 30B are infinitely superimposed and displayed). Note that, depending on an installation mode of the camera 123, images might be repeatedly displayed infinitely not only on the table display 131 but also on the window display 133.

Therefore, the server device 200 analyzes the captured image generated by the camera 123A, and deletes the image displayed on the table display 131A (display image 30B in the example in A of FIG. 19) to extract the object actually present above the table display 131A (the hand of the user A in the example in A of FIG. 19). In other words, the server device 200 analyzes the captured image obtained by capturing at least a part of the physical information of the user A (first user) and the display image of the table display 131A (second display) present in the first space 100A, thereby extracting at least a part of the physical information of the user A (first user) from the captured image. Note that, conversely, the server device 200 may analyze the captured image obtained by capturing at least a part of the physical information of the user B (second user) and the display image of the table display 131B (second display) present in the second space 100B, thereby extracting at least a part of the physical information of the user B (second user) from the captured image.

For example, the server device 200 stores the captured image generated by the camera 123A for a predetermined period, and in a case where a certain object is put on the table display 131A, this compares the latest captured image with the stored past captured image, thereby extracting the object (for example, the server device 200 extracts the object by performing background difference processing).

Thereafter, the server device 200 may generate the virtual space using an extraction result, and reflect a part of the same in the table display 131B in the second space 100B, thereby displaying only the display image 30A of the hand of the user A on the table display 131B as illustrated in C of FIG. 19. Note that, a method of extracting the object actually present on the table display 131A is not limited to the above, and known image analysis processing may be used. Furthermore, in this case also, the server device 200 may also allow each display to display the information obtained by editing the captured image obtained by the camera 123 instead of cutting out a part of the virtual space.

3. Configuration Example

The extraction processing of the object from the captured image is described above. Subsequently, a configuration example of each space and a functional configuration example of each device according to this embodiment are described.

(3.1. Configuration Example of First Space 100 or Second Space 100B)

Figure 20:
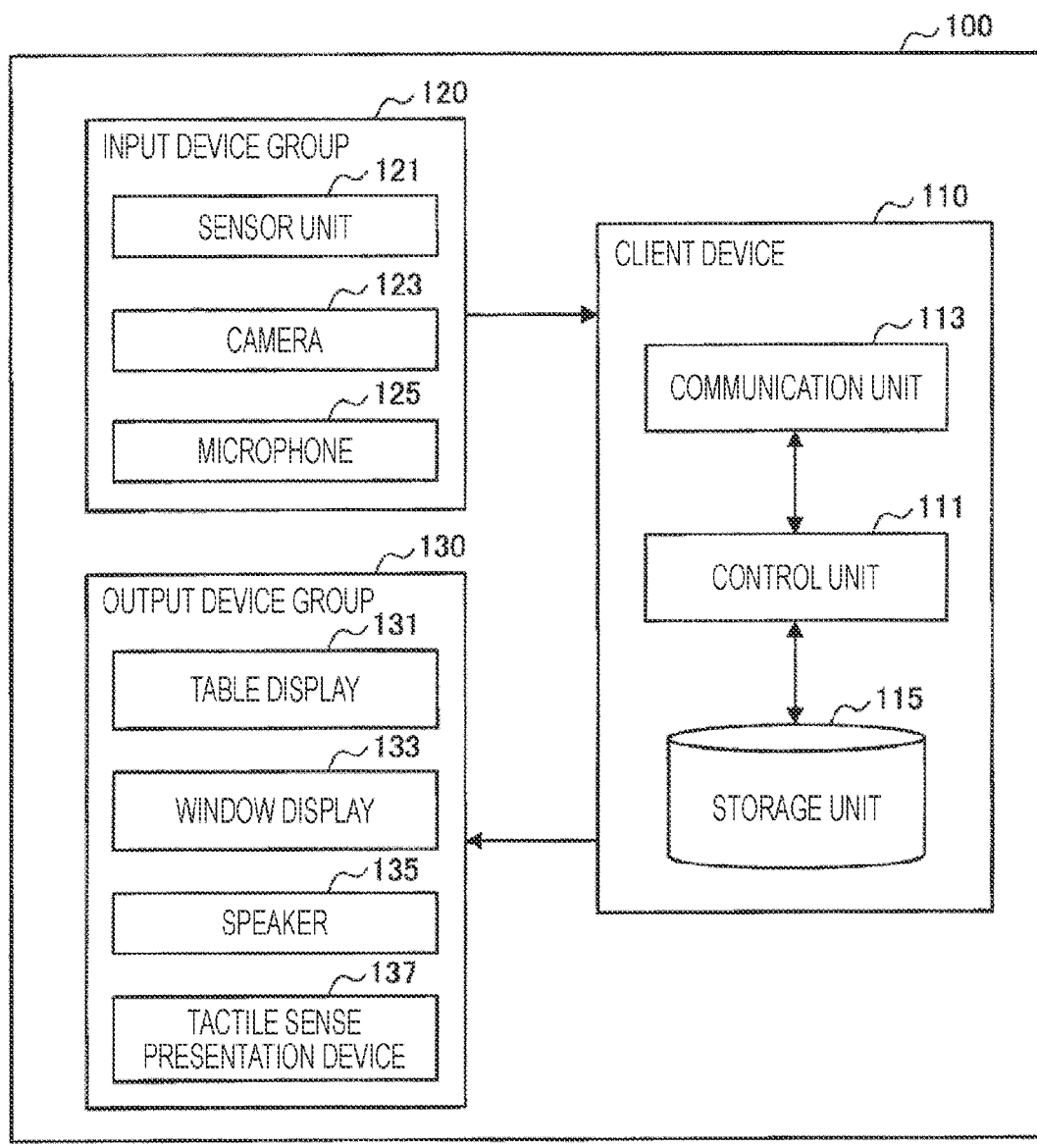
FIG. 20 is a block diagram illustrating a configuration example of the first space 100 or the second space 100B.

First, with reference to FIG. 20, a configuration example of the first space 100 or the second space 100B is described. As illustrated in FIG. 20, the first space 100 or the second space 100B is provided with the client device 110, the input device group 120, and the output device group 130.

(Client Device 110)

As described above, the client device 110 is a device which comprehensively controls the input device group 120 and the output device group 130. As illustrated in FIG. 20, the client device 110 is provided with a control unit 111, a communication unit 113, and a storage unit 115.

(Control Unit 111)

The control unit 111 is a functional configuration which comprehensively controls overall processing performed by the client device 110. For example, when the control unit 111 obtains various types of input information provided from the input device group 120, this controls processing of providing the input information to the server device 200. Note that, at that time, the control unit 111 does not provide the input information to the server device 200 as is, but this may analyze the input information and provide an analysis result to the server device 200, thereby reducing a processing load of the server device 200 or reducing a communication data amount.

Furthermore, the control unit 111 controls processing of the output device group 130 by providing the control information from the server device 200 to the output device group 130. Note that, a control content of the control unit 111 is not limited to them. For example, the control unit 111 may control processing generally performed in a general-purpose computer, a personal computer (PC), a tablet PC, a smartphone or the like (for example, processing regarding an operating system (OS) and the like).

(Communication Unit 113)

The communication unit 113 is a functional configuration which performs various communications with the external devices including the server device 200, the input device group 120, and the output device group 130. For example, the communication unit 113 receives the input information from the input device group 120 and transmits the input information to the server device 200. Furthermore, the communication unit 113 receives the control information for controlling the output device group 130 from the server device 200 and transmits the control information to the output device group 130. Note that, the information communicated by the communication unit 113 and a case of communicating are not limited to them. Furthermore, a communication method of the communication unit 113 is not especially limited.

(Storage Unit 115)

The storage unit 115 is a functional configuration which stores various types of information. For example, the storage unit 115 stores the input information provided from the input device group 120, the control information provided from the server device 200 or the like. Furthermore, the storage unit 115 stores various program, various parameters or the like used in the processing of the client device 110. Note that, the information stored in the storage unit 115 is not limited to them.

(Input Device Group 120)

The input device group 120 is a device group which generates various types of input information. As illustrated in FIG. 20, the input device group 120 is provided with a sensor unit 121, the camera 123, and a microphone 125. Note that, the configuration of the input device group 120 is not limited to them, and any device which may generate the input information may be provided on the input device group 120.

(Sensor Unit 121)

The sensor unit 121 is a configuration provided with an arbitrary sensor. For example, the sensor unit 121 may be provided with a touch sensor, a pressure sensor, a proximity sensor, an infrared light receiving unit, an ultrasonic sensor, a depth camera, a thermo camera, an RGB camera or the like, and may be provided with an operation input unit formed by using a physical configuration such as a button, a switch, a controller (for example, a stick type controller and the like), and a lever.

(Camera 123)

Figure 21:
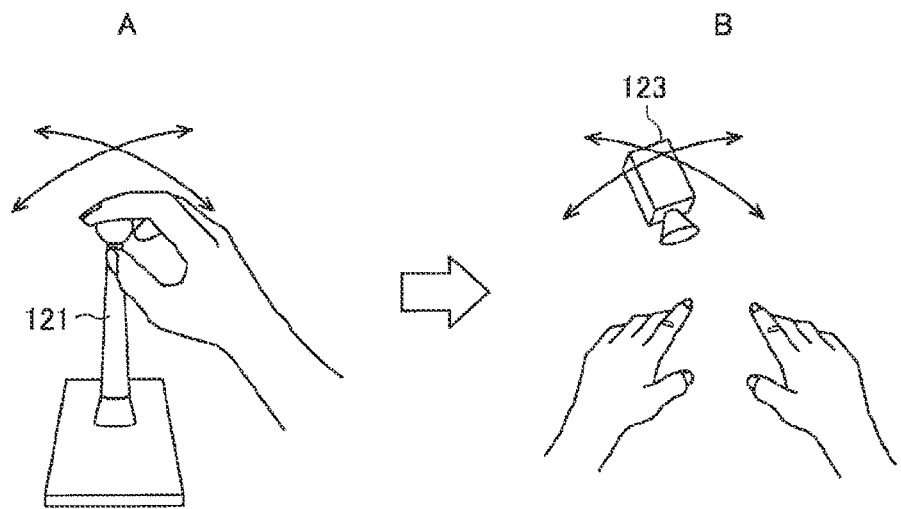
FIG. 21 is a view for illustrating a mode of a camera 123.
Figure 22:
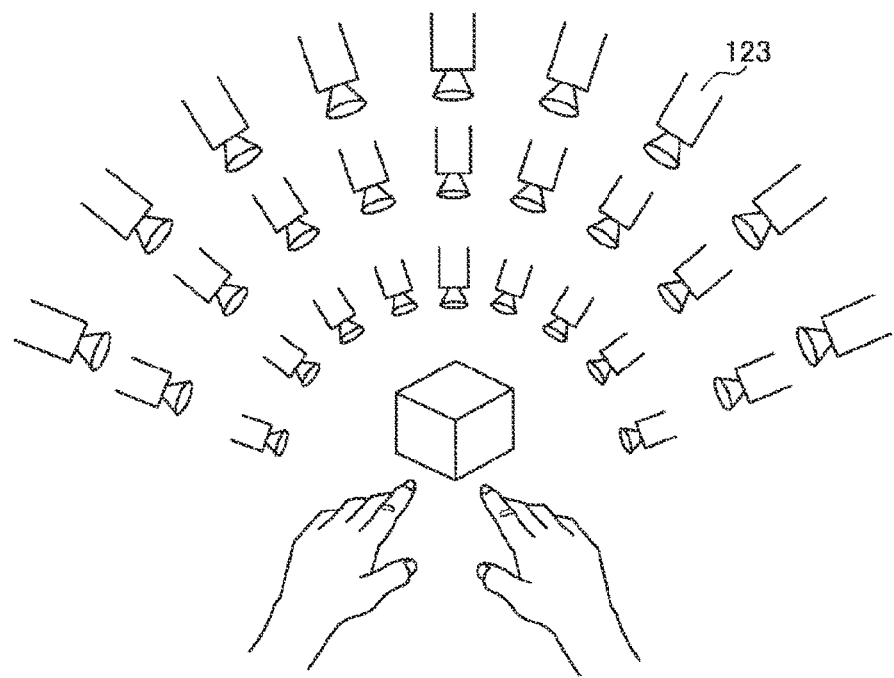
FIG. 22 is a view for illustrating a mode of the camera 123.

The camera 123 is a configuration which generates a captured image by imaging a user, a work target of the user and the like. Note that, an installation mode of the camera 123 is not especially limited. For example, the camera 123 may be installed in a mode in which an imaging direction of the camera 123 is changed as illustrated in B of FIG. 21 when the user performs an operation input to the stick-type controller provided on the sensor unit 121 as illustrated in A of FIG. 21. As a result, for example, an imaging range may be adjusted such that a feeling that the respective users work in the same space is easily created. Furthermore, as illustrated in FIG. 22, a plurality of cameras 123 may be installed in a spherical shape. This generates captured images of an object (including the body of the user) from various angles, so that it becomes more easy to adjust the imaging range such that the feeling that the respective users work in the same space is easily created or to obtain the physical information or the environmental information.

(Microphone 125)

The microphone (mic) 125 is configuration which senses a speech voice of the user and the like. Note that, an installation mode of the microphone 125 is not especially limited.

(Output Device Group 130)

As described above, the output device group 130 is a device group which performs various outputs to the user A (first user) or the user B (second user). As illustrated in FIG. 20, the output device group 130 is provided with the table display 131, the window display 133, a speaker 135, and a tactile sense presentation device 137. Note that, the configuration of the output device group 130 is not limited to them, and any device which may perform the various outputs may be provided on the output device group 130.

(Table Display 131)

The table display 131 is a display, a display surface of which is provided on a top panel portion of the table, the display located substantially parallel to the ground surface. Note that, a type of the display is not especially limited.

(Window Display 133)

The window display 133 is a display provided on one end on the table display 131 substantially perpendicular thereto, a display surface of which is located substantially perpendicular to the ground surface. Note that, a type of the display is not especially limited.

(Speaker 135)

The speaker 135 is a configuration which outputs a voice. Furthermore, for example, a sound image may be localized in a real space by cooperation of a plurality of speakers 135 and the like. As a result, each user may intuitively recognize the position, posture and the like of other users, so that the feeling that the respective users are present in the same space may be further emphasized. Note that, a type of the speaker 135 is not especially limited.

(Tactile Sense Presentation Device 13)

The tactile sense presentation device 137 is a configuration which presents a tactile sense to the user. For example, the tactile sense presentation device 137 is a wearable appliance worn by the user (for example, a glass-type, watch-type, glove-type, or cloth-type wearable device and the like), an external device which comes into contact with the body of the user and the like. The tactile sense presentation device 137 is provided with, for example, an actuator which presents vibration (for example, an eccentric motor (ERM), a linear resonance actuator (LRA), a voice coil motor (VCM) or the like), an electric element which presents a force sense, a temperature changing element which presents a temperature sense (for example, a Peltier element and the like) or the like. Note that, the tactile sense presented by the tactile sense presentation device 137 is not especially limited.

The configuration example of the first space 100 or the second space 100B is described above. Note that, the configuration described above with reference to FIG. 20 is merely an example, and the configuration of each space is not limited to such example. For example, the client device 110, the input device group 120, or the output device group 130 is not necessarily provided with all of the configurations illustrated in FIG. 20. Furthermore, the configuration in each space is flexibly deformable according to specifications and operation. Furthermore, the client device 110 may be a device capable of providing virtual reality to the user (for example, a shield-type head mounted display and the like). In this case, the table display 131 and the window display 133 are not used, and the client device 110 controls the display of the head mounted display on the basis of the control information provided from the server device 200.

(3.2. Functional Configuration Example of Server Device 200)

Figure 23:
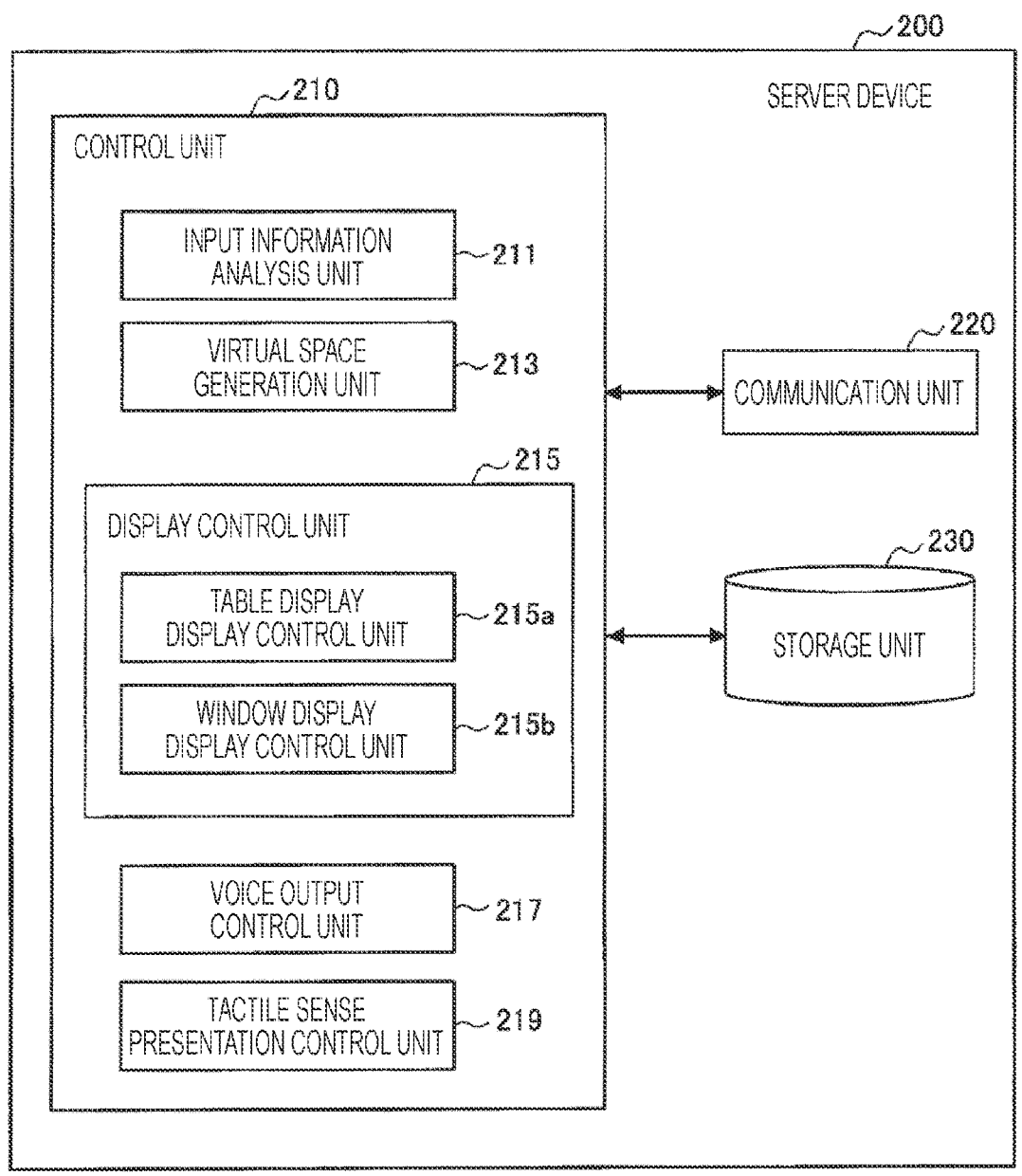
FIG. 23 is a block diagram illustrating a functional configuration example of a server device 200.

Subsequently, a functional configuration example of the server device 200 is described with reference to FIG. 23. As illustrated in FIG. 23, the server device 200 is provided with a control unit 210, a communication unit 220, and a storage unit 230.

(Control Unit 210)

The control unit 210 is a functional configuration which comprehensively controls overall processing performed by the server device 200. For example, the control unit 210 controls start and stop of various types of processing on the basis of the input performed by the user by using the input device group 120 and the like. Note that, a control content of the control unit 210 is not especially limited. For example, the control unit 210 may control processing generally performed in a general-purpose computer, a PC, a tablet PC, a smartphone or the like (for example, processing regarding an OS and the like).

As illustrated in FIG. 23, the control unit 210 is provided with an input information analysis unit 211, a virtual space generation unit 213, a display control unit 215, a voice output control unit 217, and a tactile sense presentation control unit 219.

(Input Information Analysis Unit 211)

The input information analysis unit 211 is a functional configuration which analyzes the input information obtained from the input device group 120 provided in each space (the input information analysis unit 221 also serves as an analysis unit). For example, the input information analysis unit 211 serves as an obtaining unit which obtains the physical information or the environmental information by analyzing the input information. As described above, the physical information is the concept including the positional information of the body site of each user, and the environmental information is the concept including the positional information of each portion of an object (including the input device group 120 and the output device group 130) present in each space. Note that, it should be noted that the processing of obtaining the environmental information by analyzing the input information by the input information analysis unit 211 is a concept including the processing of extracting a real object from the captured image described above.

Furthermore, the input information analysis unit 211 recognizes a gesture performed by the user, a content of a voice spoken by the user and the like by analyzing the input information. Here, the gesture includes, for example, movement of the hand and arm of the user, posture (for example, bone information), line-of-sight, touch operation (specifically, touch, tap, double tap, swipe, or drag) and the like. For example, the input information analysis unit 211 recognizes a touch operation on the table display 131, a pointing operation on the window display 133 and the like as the gesture. Furthermore, the input information analysis unit 211 recognizes the content spoken by the user by analyzing the voice of the user obtained by the microphone (mic) 125.

Moreover, the input information analysis unit 211 also serves as an operation mode control unit which switches (or sets) the operation mode on the basis of the analysis result described above. That is, the input information analysis unit 211 switches (or sets) the operation mode by selecting any one of the facing mode, the right-left reversed mode, the side-by-side mode, or the possession mode on the basis of the analysis result described above.

(Virtual Space Generation Unit 213)

The virtual space generation unit 213 is a functional configuration which generates the virtual space on the basis of the physical information or the environmental information (or at least the physical information) obtained by the input information analysis unit 211. The virtual space generation unit 213 may reproduce the positional relationship between the respective users or the respective objects in the virtual space on the basis of the physical information or the environmental information. The virtual space generation unit 213 updates the virtual space on the basis of the input information provided from the client device 110 as needed.

(Display Control Unit 215)

The display control unit 215 is a functional configuration which controls display processing by the display provided in each space. As illustrated in FIG. 23, the display control unit 215 is provided with a table display display control unit 215a and a window display display control unit 215b.

(Table Display Display Control Unit 215a)

The table display display control unit 215a is a functional configuration which controls display processing by the table display 131 provided in each space. More specifically, the table display display control unit 215a controls the display processing by the table display 131 on the basis of the content of the input recognized by the input information analysis unit 211, the operation mode set by the input information analysis unit 211, the virtual space generated by the virtual space generation unit 213 and the like.

Figure 24:
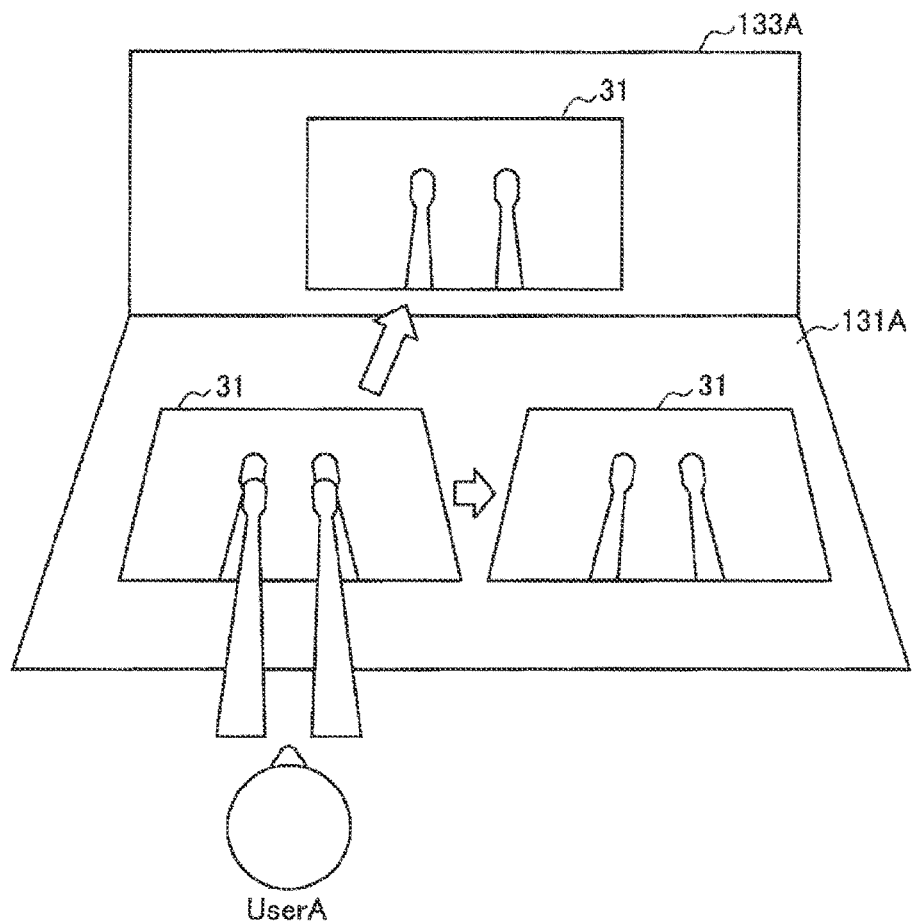
FIG. 24 is a view for illustrating a display mode of a display.

Here, the table display display control unit 215a may provide a plurality of display areas in the table display 131. For example, as illustrated in FIG. 24, the table display display control unit 215a may provide a display area 31 in the table display 131A. Then, the table display display control unit 215a may change a position of the display area 31 within the table display 131 according to an operation input by the user A and the like, or change the position of the display area 31 to the window display 133 by cooperation with the window display display control unit 215b. As a result, the user A may change the position of the display area 31 to a desired position where the work is easier.

The table display display control unit 215a generates control information including a display content by the table display 131 and provides the same to the client device 110 via the communication unit 220, thereby controlling the display processing of the table display 131.

(Window Display Display Control Unit 215b)

The window display display control unit 215b is a functional configuration which controls display processing by the window display 133 provided in each space. More specifically, the window display display control unit 215b controls the display processing by the window display 133 on the basis of the content of the input recognized by the input information analysis unit 211, the operation mode set by the input information analysis unit 211, the virtual space generated by the virtual space generation unit 213 and the like.

Here, as is the case with the table display display control unit 215a, the window display display control unit 215b may also provide a plurality of display areas 31 in the window display 133. Then, the window display display control unit 215b may also change a position of the display area 31 within the window display 133 according to an operation input by the user A and the like, or change the position of the display area 31 to the table display 131 by cooperation with the table display display control unit 215a.

The window display display control unit 215b generates the control information including the display content by the window display 133 and provides the same to the client device 110 via the communication unit 220, thereby controlling the display processing of the window display 133.

(Voice Output Control Unit 217)

The voice output control unit 217 is a functional configuration which controls voice output processing by the speaker 135 provided in each space. For example, the voice output control unit 217 transmits the voice of the user A to the user B (or the voice of the user B to the user A). The voice output control unit 217 generates control information generated on the basis of voice information of the user obtained by the microphone 125 and provides the same to the client device 110 via the communication unit 220, thereby controlling the voice output processing of the speaker 135. At that time, the voice output control unit 217 may generate the control information on the basis of the virtual space (positional relationship between the respective users) generated by the virtual space generation unit 213 and the operation mode set by the input information analysis unit 211, thereby localizing the sound image in the real space to allow the respective users to perceive the positional relationship between them.

(Tactile Sense Presentation Control Unit 219)

The tactile sense presentation control unit 219 is a functional configuration which controls tactile sense presentation processing by the tactile sense presentation device 137 provided in each space. More specifically, the tactile sense presentation control unit 219 controls the tactile sense presentation processing by the tactile sense presentation device 137 on the basis of the content of the input recognized by the input information analysis unit 211, the operation mode set by the input information analysis unit 211, the virtual space generated by the virtual space generation unit 213 and the like. The tactile sense presentation control unit 219 generates the control information including a content of the tactile sense presentation by the tactile sense presentation device 137 and provides the same to the client device 110 via the communication unit 220, thereby controlling the tactile sense presentation processing of the tactile sense presentation device 137.

(Communication Unit 220)

The communication unit 220 is a functional configuration which performs various communications with the external devices including the client device 110. For example, the communication unit 220 receives the input information obtained by the input device group 120 and transmits the control information for controlling the output device group 130 in the communication with the client device 110. Note that, the information communicated by the communication unit 220 and a case of communicating are not limited to them. Furthermore, a communication method of the communication unit 220 is not especially limited.

Here, the control unit 210 may assign priorities to the control information to be transmitted to the client device 110, and the communication unit 220 may determine various parameters (for example, an encoding method, a transmission band or the like) used in communication according to the priorities. More specifically described, the priorities of the outputs by the respective devices of the output device group 130 change depending on the type of the set operation mode, the content of the work performed by each user and the like. For example, in a case where the side-by-side mode or the possession mode is set, basically only a background is displayed on the window display 133 as illustrated in FIGS. 8 and 9 (of course, there is no limitation). Therefore, in this case, the control unit 210 may set the priority of the control information regarding the window display 133 to be lower than that of other devices. As a result, the communication unit 220 may reduce a communication amount by determining the various parameters used in the communication on the basis of the priority. Note that, a method of setting the priorities is not limited to the description above. For example, the priorities may be set on the basis of a user's point of gaze and the like (for example, the priority of the control information regarding the display which the user is gazing at is set to be higher and the like).

(Storage Unit 230)

The storage unit 230 is a functional configuration which stores various types of information. For example, the storage unit 230 stores the input information, the result of the analysis by the input information analysis unit 211, the virtual space generated by the virtual space generation unit 213, the control information generated by the display control unit 215, the voice out control unit 217, and the tactile sense presentation control unit 219 and the like. Furthermore, the storage unit 230 stores various programs, various parameters or the like used in the processing of the server device 200. Note that, the information stored in the storage unit 230 is not limited to them.

The functional configuration example of the server device 200 is described above. Note that, the functional configuration described above with reference to FIG. 23 is merely an example, and the functional configuration of the server device 200 is not limited to such example. For example, the server device 200 does not necessarily have to have all of the functional configurations illustrated in FIG. 23. Furthermore, the functional configuration of the server device 200 is flexibly deformable according to specifications and operation. Furthermore, the server device 200 may also generate the control information to be provided to the client device 110 in consideration of an audiovisual characteristic of each user. For example, the audiovisual characteristics of the respective users are different from each other depending on an attribute of the user (for example, age, sex or the like), a physical characteristic of the user (for example, body height, body weight, BMI, presence/absence of physical disability or the like), or the like. Therefore, the display control unit 215, the voice output control unit 217, and the tactile sense presentation control unit 219 of the server device 200 may estimate the audiovisual characteristic of the user by obtaining the attribute, the physical characteristic and the like of the user by a certain method (for example, input in advance by the user, analysis of the input information or the like) and generate the control information optimized for each user on the basis of an estimation result.

4. Processing Flow Example

The configuration example of each space and the functional configuration example of each device according to this embodiment are described above. Subsequently, an example of a processing flow of the server device 200 is described with reference to FIG. 25.

At step S1000, the communication unit 220 of the server device 200 receives various types of input information from the client device 110 provided in each space. At step S1004, the input information analysis unit 211 analyzes the various types of input information to obtain the physical information or the environmental information and recognize the configuration of the input. At step S1008, the virtual space generation unit 213 generates the virtual space on the basis of the physical information or the environmental information. At step S1012, processing regarding output control of the output device group 130 is performed. A specific example is to be described later. The server device 200 continues the processing at steps S1000 to S1012 until this receives a finishing instruction from the client device 110 (step S1016/No). In a case of receiving the finishing instruction from the client device 110 (step S1016/Yes), the server device 200 ends the series of processing.

Figure 25:
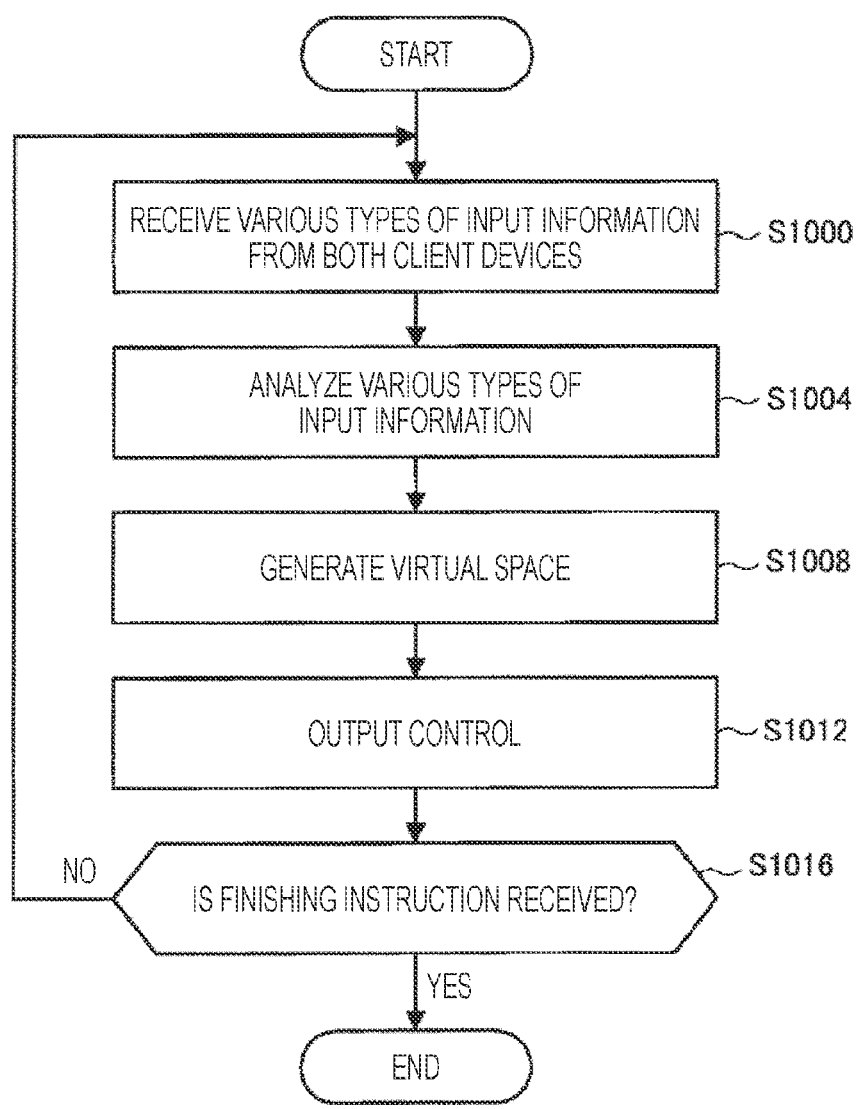
FIG. 25 is a flowchart illustrating an example of a processing flow of the server device 200.

Subsequently, an example of a processing flow regarding the output control performed at step S1012 in FIG. 25 is described with reference to FIG. 26.

Figure 26:
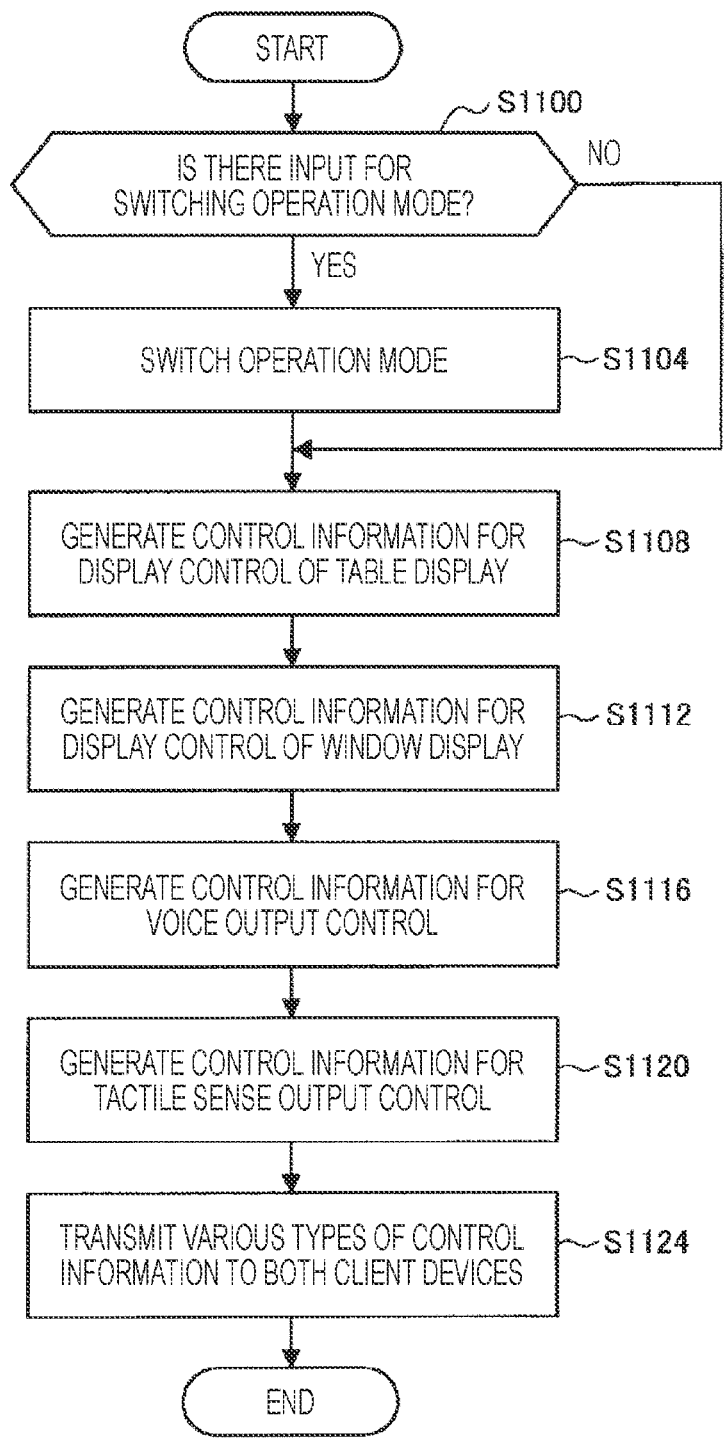
FIG. 26 is a flowchart illustrating an example of the processing flow of the server device 200.

At step S1100 in FIG. 26, the input information analysis unit 211 of the server device 200 confirms whether or not an input for switching the operation mode is performed on the basis of the analysis result of the various types of input information. In a case where the input for switching the operation mode is performed (step S1100/Yes), the input information analysis unit 211 switches the operation mode according to the input. In a case where the input for switching the operation mode is not performed (step S1100/No), operation mode switch processing at step S1104 is not performed.

Thereafter, the table display display control unit 215a and the window display display control unit 215b generate the control information on the basis of the content of the input (for example, the captured image and the like), the virtual space, the set operation mode and the like at steps S1108 and S1112, respectively. For example, the table display display control unit 215a and the window display display control unit 215b generate the control information for allowing the respective displays to display videos from viewpoints of the respective users on the basis of the change in positional relationship (or the positional relationship itself) between the user A and the user B.

At step S1116, the voice output control unit 217 generates the control information on the basis of the content of the input, the virtual space, the set operation mode and the like. For example, the voice output control unit 217 generates the control information for allowing the speaker 135 used by another user to output a voice on the basis of the voice spoken by the user obtained by the microphone 125.

At step S1120, the tactile sense presentation control unit 219 generates the control information on the basis of the content of the input, the virtual space, the set operation mode and the like. For example, the tactile sense presentation control unit 219 generates the control information for controlling a wearable appliance and the like worn by another user on the basis of the input of the user obtained by the sensor unit 121. At step S1124, the communication unit 220 transmits the generated various types of control information to both the client devices 110, so that a series of processing regarding the output control ends.

Note that, the steps in the flowcharts in FIGS. 25 and 26 described above do not necessarily have to be processed in time series in the described order. That is, the steps in the flowchart may be processed in an order different from the described order, or may be processed in parallel.

5. Variation

An example of the processing flow of the server device 200 is described above. Subsequently, a variation of the present disclosure is described.

In the embodiment described above, there is one user A (first user) and one user B (second user). In the variation of the present disclosure, a case where there are a plurality of first spaces 100A and a plurality of users A (first users) is considered. For example, a case where a plurality of users A being students receives guidance from one user B being an instructor is considered. In this case, a server device 200 may allow a window display 133 (first display) or a table display 131 (second display) to display, at least a part of physical information (first physical information) of a plurality of users A (first users).

Note that, it should be noted that the same applies to a case where there are a plurality of second spaces 100B and a plurality of users B (second users) (the same applies to a content to be described below). That is, the server device 200 may allow a window display 133 (first display) or a table display 131 (second display) to display at least a part of physical information (second physical information) of a plurality of users B (second users).

Figure 27:
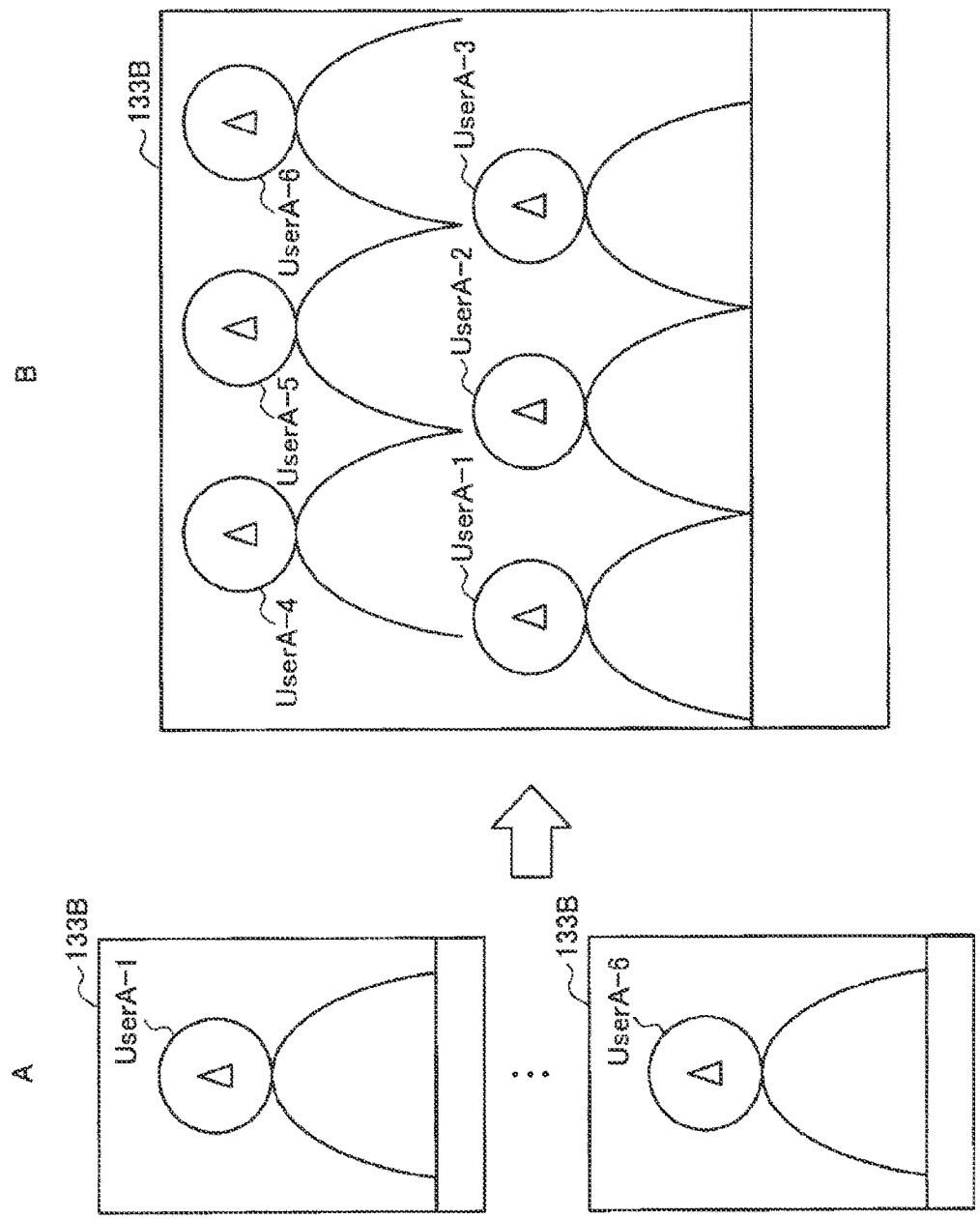
FIG. 27 is a view illustrating a display example of a window display 133B in a case where there are a plurality of first spaces 100A and a plurality of users A.
Figure 28:
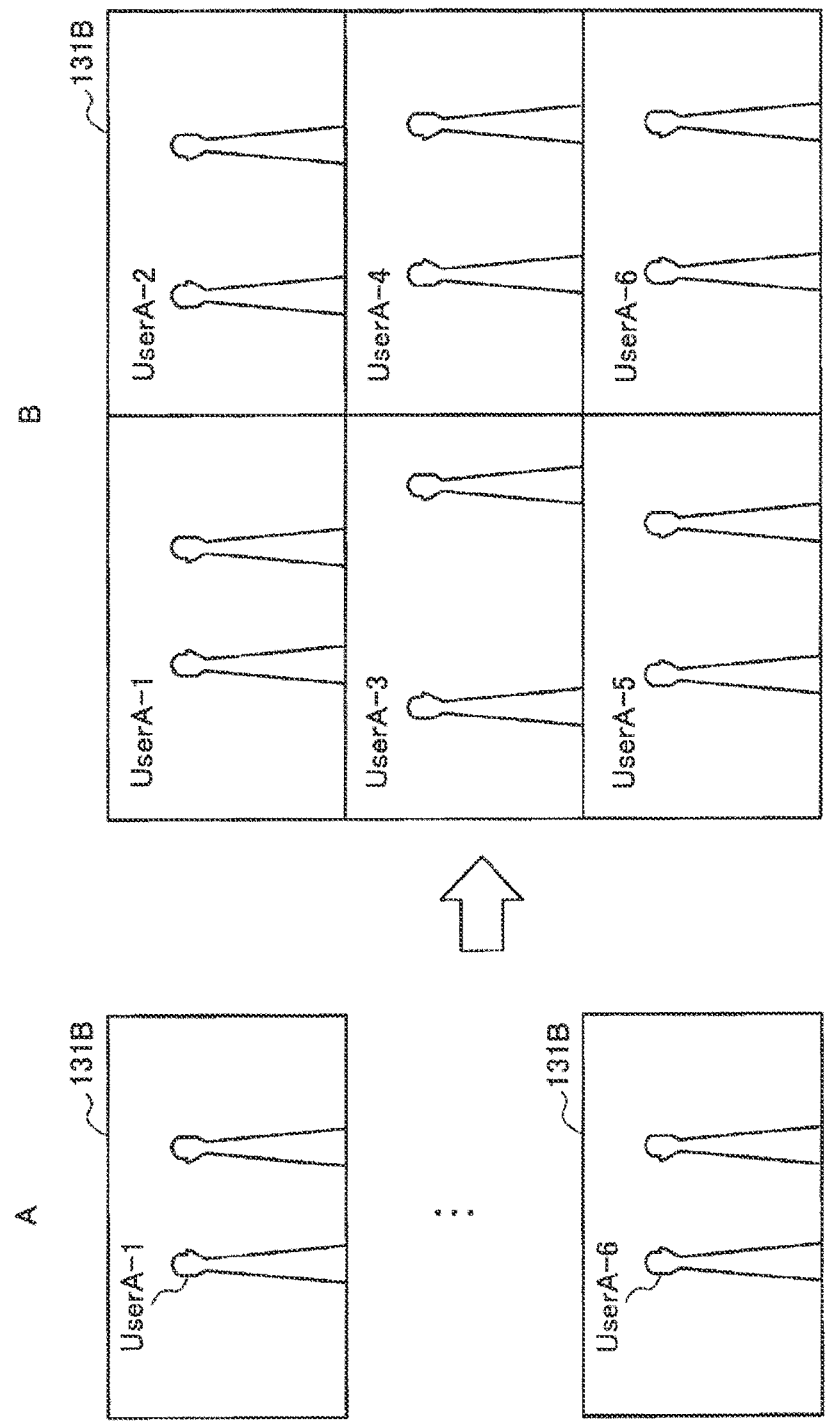
FIG. 28 is a view illustrating a display example of a table display 131B in a case where there are a plurality of first spaces 100A and a plurality of users A.

As illustrated in A of FIG. 27, in a case where there are users A-1 to A-6 (in A of FIG. 27, a case where one user is displayed on one window display 133B is illustrated), the server device 200 may extract an upper body part of the respective users A and allow the window display 133B to display them to form one or more lines as illustrated in B of FIG. 27. Furthermore, the server device 200 may allow the table display 131B divided into the number of users A to display a hand of each user A as illustrated in B of FIG. 28. At that time, the server device 200 may allow the divided table display 131B to display information used for identifying each user A (such as "User A-1" in an example in B of FIG. 28) together. Display methods in B of FIG. 27 and B of FIG. 28 allow the user B to more efficiently recognize statuses of a plurality of users A. Note that, in FIGS. 27 and 28, a case where there are a plurality of users A and one user B is illustrated as an example, but there is no limitation. More specifically, there may be one user A and a plurality of users B, or plurality of users A and a plurality of users B.

In the variation also, the server device 200 may provide to at least any one of the user A or the user B a feeling as if the respective users work in the same space. For example, the server device 200 may provide to the user B unrealistic images illustrated in B of FIG. 27 and B of FIG. 28, whereas this provides to each user A an image as if he/she faces the user B, thereby providing a feeling that he/she works in the same space as the user B. Furthermore, the server device 200 may provide also to the user B a feeling that he/she works in the same space as all the users A (for example, a feeling that he/she conducts lessons to all the users A in a classroom) by displaying a part of all the users A while adjusting a scale in a predetermined position in a predetermined background image (for example, in a position of each seat and the like in a background image of the classroom), for example.

Here, the server device 200 enables each user to have eye contact with each other. More specifically, the server device 200 adjusts a display position of the user B on the display used by the user A on the basis of a display position of each user A on the display used by the user B (for example, in a case where one user A is displayed in an upper right portion of the window display 133B of the user B, the user B is displayed in a lower right portion of a window display 133A of the user A). As a result, in a case where the user B has eye contact with one user A, this user A may also perceive that he/she has eye contact with the user B via the window display 133A. Note that, the server device 200 may enable each user to have eye contact not by adjusting the positions of the user A and the user B as described above but by processing an image of an eye part (or in the vicinity of the eye part) of the user A or the user B and the like.

In the variation, the server device 200 may evaluate the work of each user A by analyzing the first physical information of each of the plurality of users A (first users) (of course, the server device 200 may evaluate the work of each user B by analyzing the second physical information of each of the plurality of users B (second users), conversely. More specifically, the server device 200 may compare a captured image obtained by imaging a work model registered in advance with a captured image obtained by imaging a state of the work of each user A to calculate similarity, thereby evaluating elements such as accuracy, speed or the like of the work of each user A (furthermore, the server device 200 may output a learning level as a comprehensive evaluation on the basis of these elements).

Then, in a case where the server device 200 detects a singular user A (for example, a user A whose work is particularly accurate and speedy as compared to other users A and the like) by analyzing the captured image, this may notify the user B of the fact by performing a predetermined output (for example, by highlighting this person on the display) on an output device group 130 (for example, the table display 131B, the window display 133B or the like) of the user B. Note that, a content of the notification to the user B is not limited to this. For example, the server device 200 may notify the user B of a progress status of each user A by a predetermined method (for example, a numerical value, a progress bar, a voice output, lamp lighting or the like).

Moreover, the server device 200 may analyze a work status of each user A by using a predetermined machine learning method or artificial intelligence (AI), thereby calculating, for example, an average value of the accuracy and speed of the work among all the users A (for example, an entire class) or calculating the same for each category by attribute (for example, age, sex, blood type or the like). As a result, the user B may more easily perform trend analysis among all the users A and for each category, thereby providing guidance more appropriately.

Figure 29:
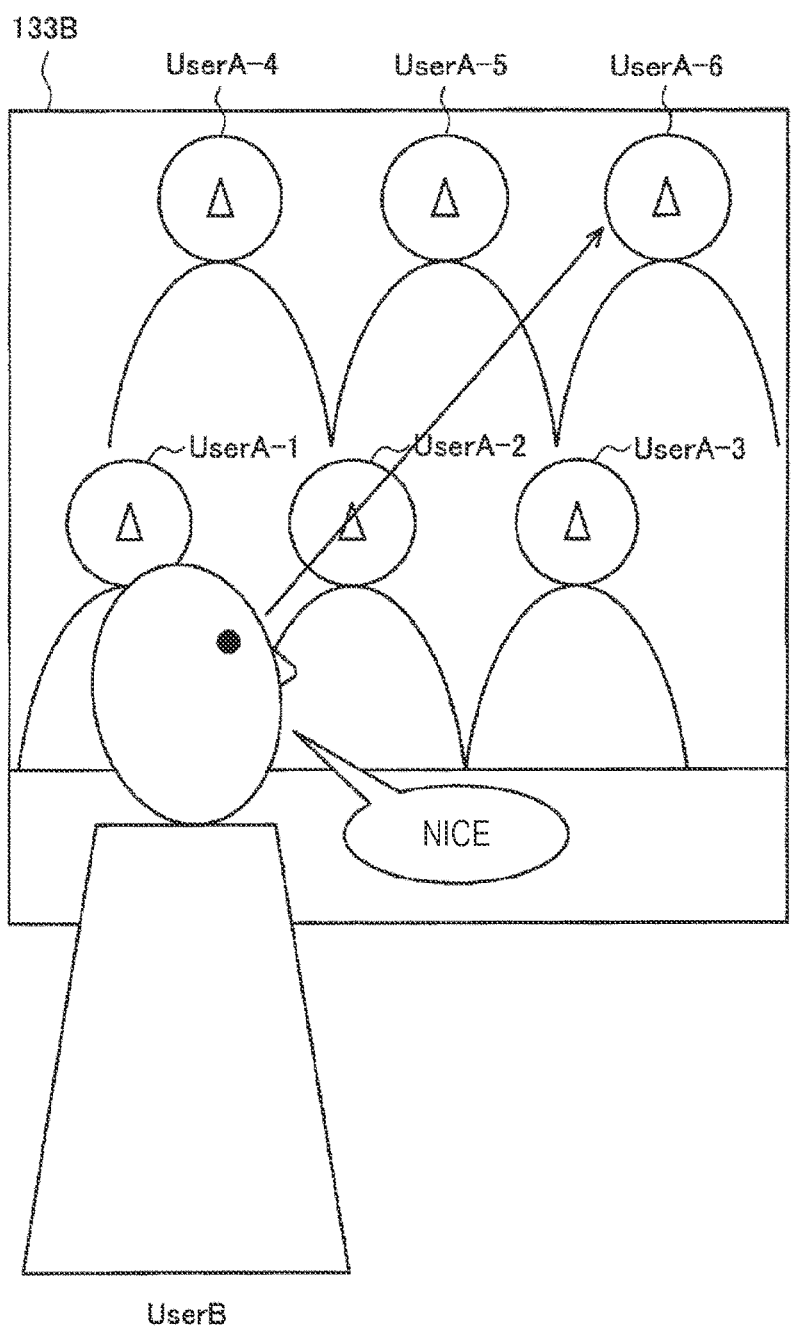
FIG. 29 is a view for illustrating an example of a case where various outputs are performed only to at least one of the plurality of users A.

Furthermore, the server device 200 may specify at least one of the plurality of users A (first users) on the basis of the input by the user B (second user) and perform various outputs only to this user A (note that, the server device 200 may specify at least one of the plurality of users B (second users) on the basis of the input by the user A (first user) and perform various outputs only to this user B, conversely). For example, as illustrated in FIG. 29, a case where the server device 200 recognizes that the user B gives a glance to a certain user A by analyzing the captured image in which the user B is imaged (in the example in FIG. 29, the user B gives a glance to the user A-6) is considered. In this case, as illustrated in A of FIG. 30, the server device 200 may highlight the window display 133A used by the user A-6, thereby notifying the user A-6 that the user B gives a glance to the user A-6. At that time, as illustrated in B of FIG. 30, the window displays 133A used by the users A-1 to A-5 to whom the user B does not give a glance is not highlighted.

Figure 30:
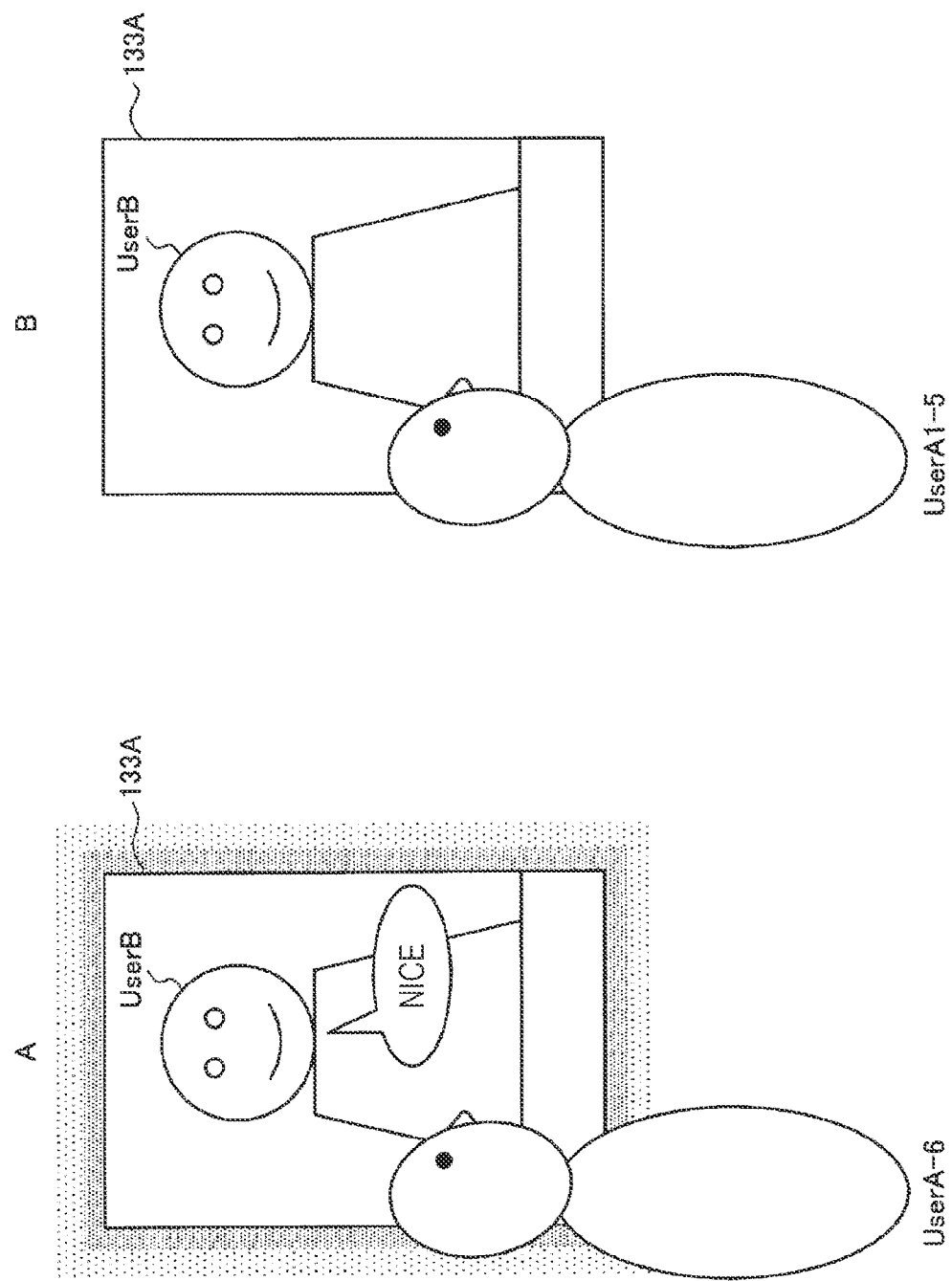
FIG. 30 is a view for illustrating an example of a case where various outputs are performed only to at least one of the plurality of users A.

Moreover, in a case where the user A says something in this state, the server device 200 may notify only the user A-6 of this statement by using the microphone 125 (in the examples in FIGS. 29 and 30, the user B says "nice".) At that time, as illustrated in B of FIG. 30, the users A-1 to A-5 to whom the user B does not give a glance are not notified of the statement.

Here, in a case where the instructor provides certain guidance to a plurality of students, it is generally considered important to give warning, advice and the like to a part of students individually. For example, a part of the students who receives the warning and advice may more easily accept the warning and advice because they do not feel ashamed of being heard by other students. Therefore, as described above, the server device 200 may realize smoother guidance by performing various outputs only to one of the plurality of users A. Of course, in a case where the instructor notifies the student of a positive message and the like, the server device 200 may notify all the users A of this.

Figure 31:
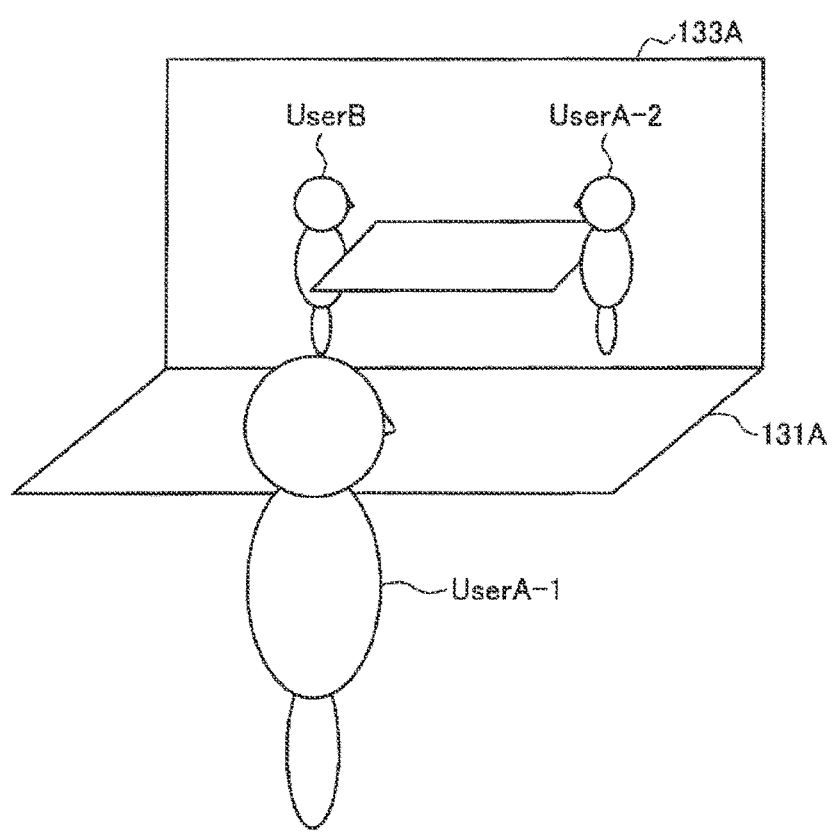
FIG. 31 is a view for illustrating a peep mode.

Furthermore, in a case where there is a plurality of users A (first users), an operation mode in which the user A may watch a state of communication between the user B (second user) and another user A may be newly provided. Hereinafter, an operation mode in which a certain user A may watch the state of communication between the user B and another user A is referred to as a "peep mode". According to the peep mode, as illustrated in FIG. 31, the user A-1 may watch the communication between the user B and the user A-2 in a facing state from another viewpoint and the like. Therefore, the user A-1 may obtain information exchanged through not only the communication between him/her and the user B but also the communication between the user A-2 and the user B, so that the learning and the like becomes more effective.

A trigger used for switching from another operation mode to the peep mode is not especially limited as in the above-described embodiment. More specifically, it is assumed that the trigger used for switching to the peep mode is a trigger caused by at least any one of the user A (first user) or the user B (second user). For example, the trigger used for switching to the peep mode includes a predetermined behavior by the user A or the user B (for example, actual movement of the user A-1 to a position where it is possible to watch a state in which the user B and the user A-2 actually communicate with each other in the virtual space and the like), a predetermined statement (for example, the statement of "I'll go there." by the user A-1 and the like), a predetermined operation input or the like (for example, touch on the table display 131A, press of a button by the user A-1 or the like). For example, when the virtual space generated by the server device 200 is displayed on the display, the user A may select a position and a direction for peeping by selecting arbitrary position and direction in the virtual space. Note that, a content of the trigger used for switching to the peep mode is not limited to them.

Note that, contents of functions of respective functional configurations of the client device 110 and the server device 200 do not particularly change also in the variation of the present disclosure. For example, also in the variation of the present disclosure, an input information analysis unit 211 of the server device 200 analyzes the input information (for example, the captured image and the like), and a display control unit 215, a voice output control unit 217, and a tactile sense presentation control unit 219 control the output to each user (for example, the display control unit 215 allows the display to display a part of the physical information (first physical information) of a plurality of users A (first users) side by side and the like).

6. Hardware Configuration Example

The variation of the present disclosure is described above. Subsequently, a hardware configuration example of the server device 200 or the client device 110 is described with reference to FIG. 32.

Figure 32:
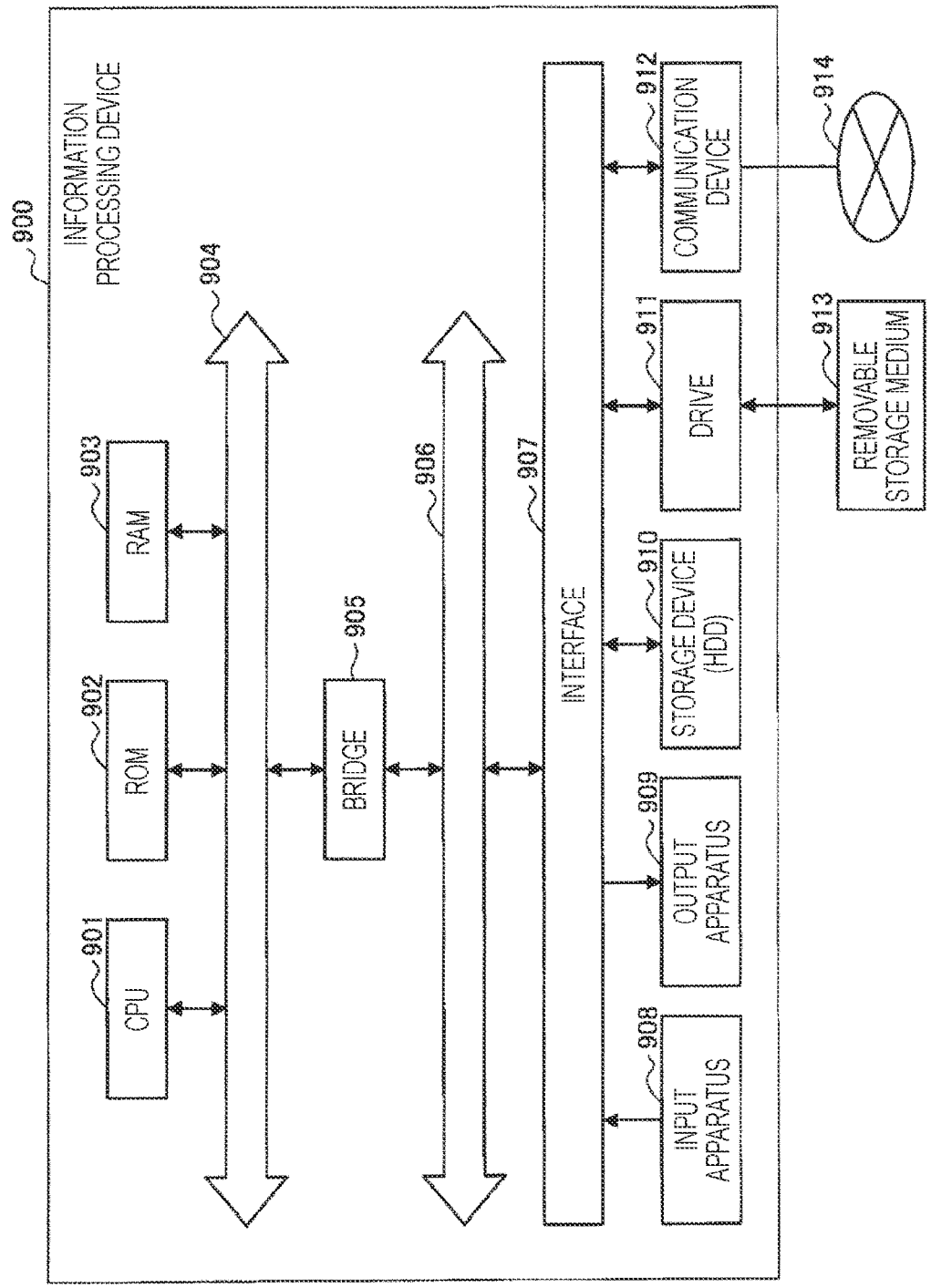
FIG. 32 is a block diagram illustrating a hardware configuration example of an information processing device 900 which embodies the server device 200 or the client device 110.

FIG. 32 is a block diagram illustrating a hardware configuration example of an information processing device 900 which embodies the server device 200 or the client device 110. The information processing device 900 is provided with a central processing unit (CPU) 901, a read only memory (ROM) 902, a random access memory (RAM) 903, a host bus 904, a bridge 905, an external bus 906, an interface 907, an input apparatus 908, an output apparatus 909, a storage device (HDD) 910, a drive 911, and a communication device 912.

The CPU 901 serves as an arithmetic processing device and a control device, and controls overall operations in the information processing device 900 according to various programs. Furthermore, the CPU 901 may also be a microprocessor. The ROM 902 stores the program used by the CPU 901, operation parameters and the like. The RAM 903 temporarily stores the program used in execution of the CPU 901, parameters which change as appropriate in the execution thereof and the like. They are connected to each other by the host bus 904 including a CPU bus and the like. Each function of the control unit 210 of the server device 200 or the control unit 111 of the client device 110 is realized by cooperation of the CPU 901 the ROM 902, and the RAM 903.

The host bus 904 is connected to the external bus 906 such as a peripheral component interconnect/interface (PCI) bus via the bridge 905. Note that, the host bus 904, the bridge 905, and the external bus 906 do not necessarily have to be configured separately, and these functions may be mounted on one bus.

The input apparatus 908 includes an input means such as a mouse, a keyboard, a touch panel, a button, a microphone, a switch, and a lever for a user to input information, an input control circuit which generates an input signal on the basis of the input by the user and outputs the same to the CPU 901 and the like. By operating the input apparatus 908, the user who uses the information processing device 900 may input various data to each device and provides an instruction of processing operation. Although a case where the input device group 120 is provided outside the client device 110 is described above as an example, in a case where a part of the input device group 120 is provided in the client device 110, the input device group 120 may be embodied by the input apparatus 908.

The output apparatus 909 includes, for example, a display device such as a cathode ray tube (CRT) display device, a liquid crystal display (LCD) device, an organic light emitting diode (OLED) device, and a lamp. Furthermore, the out apparatus 909 includes a voice output device such as a speaker and headphones. Moreover, the output apparatus 909 includes an arbitrary wearable device (for example, a glass-type, watch-type, glove-type, cloth-type wearable device or the like). Although a case where the output device group 130 is provided outside the client device 110 is described above as an example, in a case where a part of the output device group 130 is provided in the client device 110, the output device group 130 may be embodied by the output apparatus 909.

The storage device 910 is a device for storing data. The storage device 910 may include a storage medium, a recording device which records data in the storage medium, a reading device which reads the data from the storage medium, a deleting device which deletes the data recorded in the storage medium and the like. The storage device 910 includes, for example, a hard disk drive (HDD). The storage device 910 drives the hard disk and stores programs executed by the CPU 901 and various data. The storage device 910 realizes the function of the storage unit 230 of the server device 200 or the storage unit 115 of the client device 110.

The drive 911 a reader/writer for a storage medium, and is built in or externally mounted on the information processing device 900. The drive 911 reads out information recorded in a removable storage medium 913 such as a magnetic disc, an optical disc, a magnetooptical disc, or a semiconductor memory mounted thereon to output to the RAM 903. Furthermore, the drive 911 may also write information in the removable storage medium 913.

The communication device 912 is, for example, a communication interface configured by a communication device and the like for connecting to a communication network 914. The communication device 912 realizes the function of the communication unit 220 of the server device 200 or the communication unit 113 of the client device 110.

7. Summary

As described above, the information processing device (server device 200) according to the present disclosure obtains the first physical information of the first user (for example, the instructor) present in the first space 100A or the second physical information of the second user (for example, the student) present in the second space 100B and generates the virtual space on the basis of the first or second physical information. More specifically, the information processing device generates the virtual space which reproduces the positional relationship of the first user or the second user. Note that, as described above, the information processing device may also reproduce the object present in each space in the virtual space by using the first environmental information regarding the object present in the first space 100A or the second environmental information regarding the object present in the second space 100B.

Then, in a case where the trigger caused by at least any one of the first user or the second user occurs, the information processing device switches the operation mode, and interlocks the switch of the operation mode with at least one device provided in the first space 100A or the second space 100B (for example, the table display 131, the window display 133, the speaker 135, the tactile sense presentation device 137 or the like). For example, the information processing device reflects the information obtained by editing the captured image obtained by the camera 123 or partial information of the virtual space in the display and the like provided in the first space 100A or the second space 100B.

As a result, the information processing device may allow the first user or the second user present in the different spaces to feel as if the respective users work in the same space.

Although the preferred embodiment of the present disclosure is described above in detail with reference to the attached drawings, the technical scope of the present disclosure is not limited to such examples. It is clear that one of ordinary skill in the technical field of the present disclosure may conceive of various modifications and corrections within the scope of the technical idea recited in claims and it is understood that they also naturally belong to the technical scope of the present disclosure.

For example, although a case where the information processing system according to the present disclosure is used for guidance regarding surgery and handicrafts is described above (FIGS. 16 and 17) as an example, the application of the information processing system according to the present disclosure is not limited to this.

Figure 33:
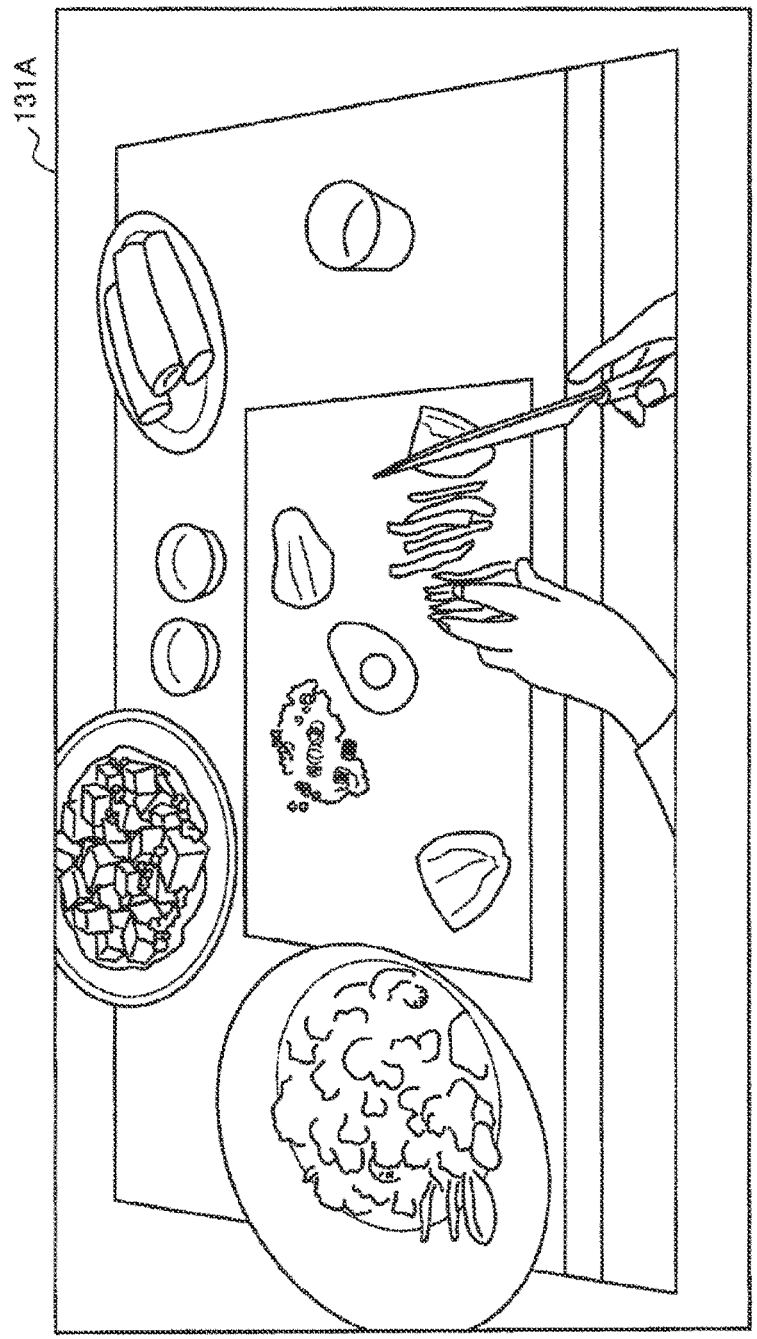
FIG. 33 is a view for illustrating an application example of the information processing system according to the present disclosure.
Figure 34:
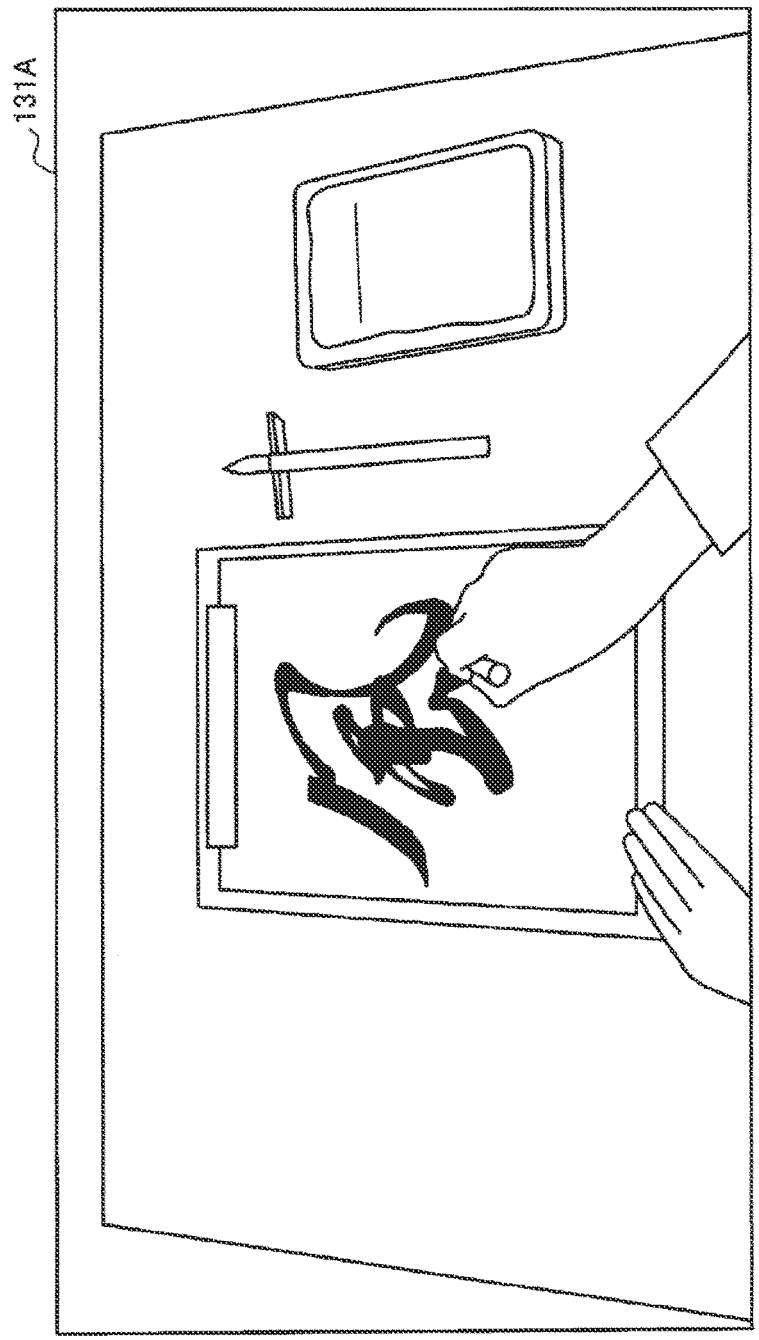
FIG. 34 is a view for illustrating an application example of the information processing system according to the present disclosure.
Figure 35:
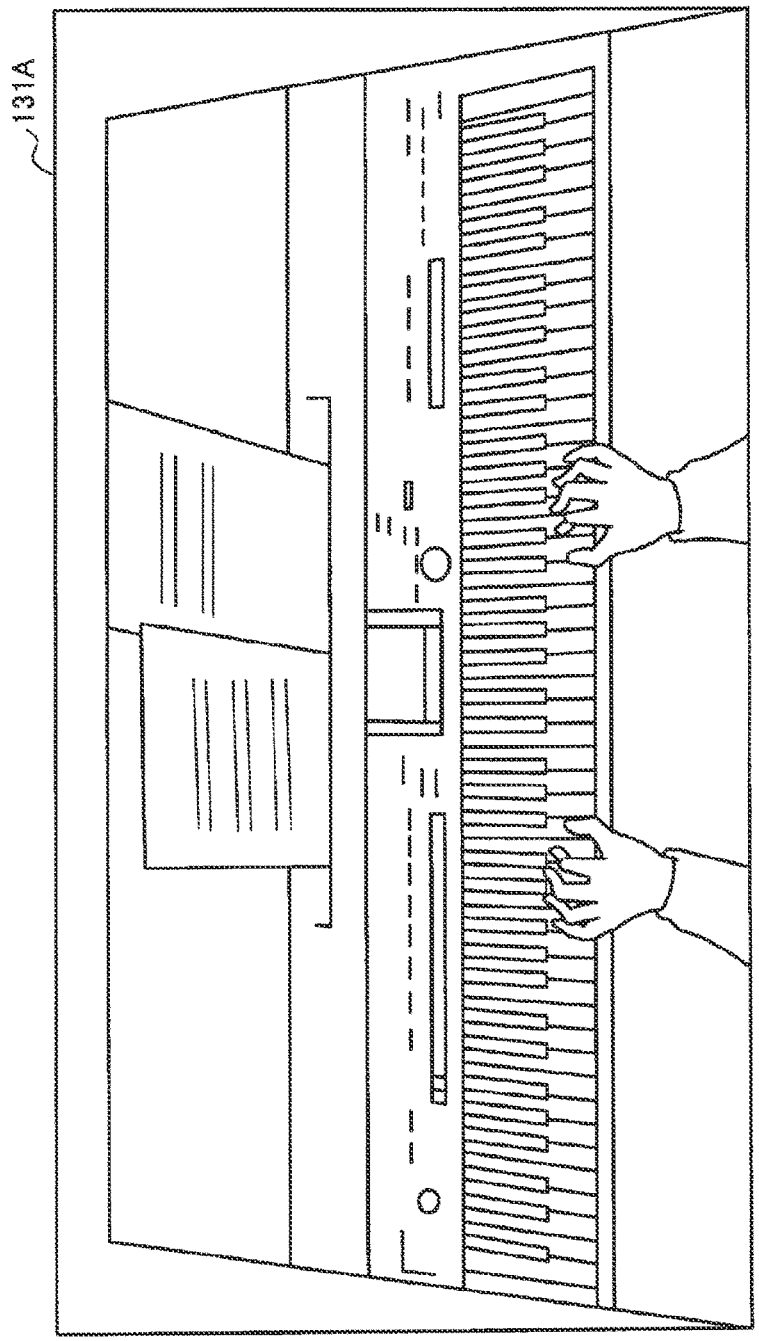
FIG. 35 is a view for illustrating an application example of the information processing system according to the present disclosure.

For example, the information processing system according to the present disclosure may be used for various communications performed by a plurality of users such as guidance regarding cooking as illustrated in FIG. 33, guidance regarding calligraphy as illustrated in FIG. 34, guidance regarding musical instrument play as illustrated in FIG. 35, or an interview and a conference conducted by using documents as illustrated in FIG. 36. It may be said that the information processing system according to the present disclosure is particularly useful for applications requiring delicate work because of its characteristic that a plurality of users may communicate with each other while changing their positional relationships and postures.

Furthermore, the effects described in this specification are merely illustrative or exemplary, and are not limiting. That is, the technology according to the present disclosure may exhibit other effects obvious to those skilled in the art from the description of this specification together with or in place of the effects described above.

Note that, the following configurations also belong to the technical scope of the present disclosure.

(1)

An information processing device provided with:

an obtaining unit that obtains first physical information of a first user present in a first space, and second physical information of a second user present in a second space;

a virtual space generation unit that generates a virtual space on the basis of the first physical information or the second physical information;

an operation mode control unit that switches an operation mode in a case where a trigger caused by at least any one of the first user or the second user occurs; and a control unit that interlocks switch of the operation mode with at least one device present in the first space or at least one device present in the second space.

(2)

The information processing device according to (1) described above, in which the obtaining unit further obtains first environmental information including information regarding an object present in the first space, or second environmental information including information regarding an object present in the second space, and the virtual space generation unit generates the virtual space also on the basis of the first environmental information or the second environmental information.

(3)

The information processing device according to described above, in which the operation mode control unit switches the operation mode on the basis of a change in positional relationship between the first user and the second user in the virtual space.

(4)

The information processing device according to (3) described above, in which the positional relationship includes at least any one of a relationship in which the first user and the second user are located face-to-face with each other, a relationship in which the first user and the second user are located side-by-side in a state of facing substantially in the same direction, or a relationship in which the first user and the second user are located such that one covers the other in a state of facing substantially in the same direction.

(5)
The information processing device according to any one of (1) to (4) described above,
in which the device includes at least one display.

(6)
The information processing device according to (5) described above,
in which the device includes a first display a display surface of which is located substantially perpendicular to a ground surface, and a second display a display surface of which is located substantially parallel to the ground surface.

(7)
The information processing device according to (6) described above,
in which the second display is also used as a working table for the first uses or the second user.

(8)
The information processing device according to (7) described above,
in which the control unit allows the first display or the second display present in the first space to display at least a part of the second physical information.

(9)
The information processing device according to (8) described above, further provided with:
an analysis unit that analyzes a captured image in which at least a part of the second physical information and a display image of the second display present in the second space are captured to extract at least a part of the second physical information from the captured image.

(10)
The information processing device according to (9) described above,
in which, in a case where there are a plurality of second spaces and a plurality of second users,
the control unit allows the first display or the second display to display at least a part of the second physical information of each of the plurality of second users.

(11)
The information processing device according to (10) described above,
in which the analysis unit analyzes the second physical information of each of the plurality of second users to evaluate work of each of the second users.

(12)
The information processing device according to any one of (1) to (11) described above,
in which the control unit controls at least one device present in the second space on the basis of an input by the first user.

(13)
The information processing device according to (12) described above,
in which, in a case where there are a plurality of second spaces and a plurality of second users,
the control unit specifies at least any one of the plurality of second spaces on the basis of the input by the first user, and controls at least one device present in the specified second space.

(14)
The information processing device according to any one of (1) to (13) described above,
in which the device includes a speaker or a tactile sense presentation device.

(15)
An information processing method executed by a computer, the method provided with:
obtaining first physical information of a first user present in a first space, and second physical information of a second user present in a second space;
generating a virtual space on the basis of the first physical information or the second physical information;
switching an operation mode in a case where a trigger caused by at least any one of the first user or the second user occurs; and
interlocking switch of the operation mode with at least one device present in the first space or at least one device present in the second space.

(16)
A program that allows a computer to realize:
obtaining first physical information of a first user present is a first space, and second physical information of a second user present in a second space;
generating a virtual space on the basis of the first physical information or the second physical information;
switching an operation mode in a case where a trigger caused by at least any one of the first user or the second user occurs; and
interlocking switch of the operation mode with at least one device present in the first space or at least one device present in the second space.

REFERENCE SIGNS LIST

100A First space
100B Second space
110 Client device
111 Control unit
113 Communication unit
115 Storage unit
120 Input device group
121 Sensor unit
123 Camera
125 Microphone
130 Output device group
131 Table display
133 Window display
135 Speaker
137 Tactile sense presentation device
200 Server device
210 Control unit
211 Input information analysis unit
213 Virtual space generation unit
215 Display control unit
215a Table display display control unit
215b Window display display control unit
217 Voice output control unit
219 Tactile sense presentation control unit
220 Communication unit
230 Storage unit
300 Network

The invention claimed is:
1. An information processing device comprising:
an obtaining unit configured to
obtain first physical information of a first user present in a first space, and
obtain second physical information of a second user present in a second space;
a virtual space generation unit configured to generate a virtual space based on at least one of the first physical information or the second physical information;

an operation mode control unit configured to switch an operation mode among a plurality of operation modes in a case where a trigger caused by at least any one of the first user or the second user occurs; and a control unit configured to interlock the switch of the operation mode with at least one device present in the first space or at least one device present in the second space, wherein each operation mode of the plurality of operation modes relates to a positional relationship between the first user and the second user in the virtual space, and wherein the obtaining unit, the virtual space generation unit, the operation mode control unit, and the control unit are each implemented via at least one processor.

2. The information processing device according to claim 1, wherein the obtaining unit is further configured to
obtain first environmental information including information regarding an object present in the first space, or
obtain second environmental information including information regarding an object present in the second space, and
the virtual space generation unit generates the virtual space further based on the first environmental information or the second environmental information.

3. The information processing device according to claim 2, wherein the operation mode control unit switches the operation mode based on a change in the positional relationship between the first user and the second user in the virtual space.

4. The information processing device according to claim 3, wherein the positional relationship includes at least any one of a relationship in which the first user and the second user are located face-to-face with each other, a relationship in which the first user and the second user are located side-by-side in a state of facing in a same direction, or a relationship in which the first user and the second user are located such that one covers the other from behind in a state of facing in the same direction.

5. The information processing device according to claim 1, wherein each device includes at least one display.

6. The information processing device according to claim 5, wherein each device includes a first display a display surface of which is located perpendicular to a ground surface, and a second display a display surface of which is located parallel to the ground surface.

7. The information processing device according to claim 6, wherein the second display of each device is further configured as a working table for the first user or the second user.

8. The information processing device according to claim 7, wherein the control unit is further configured to initiate the first display or the second display present in the first space to display at least a part of the second physical information.

9. The information processing device according to claim 8, further comprising:

an analysis unit configured to analyze a captured image in which at least a part of the second physical information and a display image of the second display present in the second space are captured to extract at least a part of the second physical information from the captured image, wherein the analysis unit is implemented via at least one processor.

10. The information processing device according to claim 9, wherein, in a case where there are a plurality of second spaces and a plurality of second users,
the control unit is further configured to initiate the first display or the second display to display at least a part of the second physical information of each of the plurality of second users.

11. The information processing device according to claim 10, wherein the analysis unit is further configured to analyze the second physical information of each of the plurality of second users to evaluate work of each of the second users.

12. The information processing device according to claim 1, wherein the control unit controls the at least one device present in the second space based on an input by the first user.

13. The information processing device according to claim 12, wherein, in a case where there are a plurality of second spaces and a plurality of second users,
the control unit specifies at least any one of the plurality of second spaces based on the input by the first user, and controls at least one device present in the specified second space.

14. The information processing device according to claim 1, wherein each device includes at least one of a speaker or a tactile sense presentation device.

15. An information processing method executed by a computer, the method comprising:

obtaining first physical information of a first user present in a first space;
obtaining second physical information of a second user present in a second space;
generating a virtual space based on at least one of the first physical information or the second physical information;
switching an operation mode among a plurality of operation modes in a case where a trigger caused by at least any one of the first user or the second user occurs; and
interlocking the switching of the operation mode with at least one device present in the first space or at least one device present in the second space,
wherein each operation mode of the plurality of operation modes relates to a positional relationship between the first user and the second user in the virtual space.

16. A non-transitory computer-readable storage medium having embodied thereon a program, which when executed by a computer causes the computer to execute a method, the method comprising that allows a computer to realize:

obtaining first physical information of a first user present in a first space;
obtaining second physical information of a second user present in a second space;
generating a virtual space based on at least one of the first physical information or the second physical information;

switching an operation mode among a plurality of operation modes in a case where a trigger caused by at least any one of the first user or the second user occurs; and
interlocking the switching of the operation mode with at least one device present in the first space or at least one device present in the second space,
wherein each operation mode of the plurality of operation modes relates to a positional relationship between the first user and the second user in the virtual space.

* * * * *